United States Patent
Hall et al.

(10) Patent No.: US 11,447,679 B2
(45) Date of Patent: Sep. 20, 2022

(54) CORE-SHELL PARTICLES FOR TREATMENT OF SUBTERRANEAN FORMATIONS

(71) Applicant: Halliburton Energy Services, Inc., Houston, TX (US)

(72) Inventors: Lee Hall, The Woodlands, TX (US); Jay Paul Deville, Spring, TX (US); Mohammad Vatankhah Varnosfaderani, Carrboro, NC (US); Sergey Sheyko, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/753,407

(22) PCT Filed: Sep. 15, 2015

(86) PCT No.: PCT/US2015/050093
§ 371 (c)(1),
(2) Date: Feb. 19, 2018

(87) PCT Pub. No.: WO2017/048230
PCT Pub. Date: Mar. 23, 2017

(65) Prior Publication Data
US 2018/0237680 A1     Aug. 23, 2018

(51) Int. Cl.
| C09K 8/035 | (2006.01) |
| C09K 8/68 | (2006.01) |
| C09K 8/70 | (2006.01) |
| C09K 8/72 | (2006.01) |
| C09K 8/92 | (2006.01) |

(Continued)

(52) U.S. Cl.
CPC ............... *C09K 8/035* (2013.01); *C09K 8/03* (2013.01); *C09K 8/68* (2013.01); *C09K 8/685* (2013.01); *C09K 8/70* (2013.01); *C09K 8/72* (2013.01); *C09K 8/725* (2013.01); *C09K 8/805* (2013.01); *C09K 8/882* (2013.01); *C09K 8/887* (2013.01); *C09K 8/92* (2013.01); *C09K 2208/10* (2013.01); *E21B 21/00* (2013.01); *E21B 21/003* (2013.01);
(Continued)

(58) Field of Classification Search
None
See application file for complete search history.

(56) References Cited

U.S. PATENT DOCUMENTS 3,252,904 A * 5/1966 Carpenter .............. C09K 8/685
                                                                166/283
3,507,341 A     4/1970 Basgan
(Continued)

FOREIGN PATENT DOCUMENTS

WO     2013-166128     5/2011

OTHER PUBLICATIONS

International Search Report and Written Opinion for PCT/US2015/050093 dated May 13, 2016.
(Continued)

*Primary Examiner* — Angela M DiTrani Leff
(74) *Attorney, Agent, or Firm* — Tenley Krueger; C. Tumey Law Group PLLC

(57) ABSTRACT

Core-shell particles for treatment of subterranean formations are provided. A method may include placing in the subterranean formation a composition including a core-shell particle including a hydrophilic core and a hydrophobic shell.

33 Claims, 7 Drawing Sheets

(51) Int. Cl.
*C09K 8/03* (2006.01)
*C09K 8/80* (2006.01)
*C09K 8/88* (2006.01)
*E21B 21/00* (2006.01)
*E21B 33/14* (2006.01)
*E21B 37/00* (2006.01)
*E21B 43/26* (2006.01)

(52) U.S. Cl.
CPC ............... *E21B 33/14* (2013.01); *E21B 37/00* (2013.01); *E21B 43/26* (2013.01)

(56) References Cited

U.S. PATENT DOCUMENTS

| | | | |
|---|---|---|---|
| 6,444,316 B1 * | 9/2002 | Reddy | B01J 13/22 |
| | | | 428/407 |
| 9,371,479 B2 * | 6/2016 | Mirakyan | C09K 8/605 |
| 9,796,919 B2 * | 10/2017 | Chang | C09K 8/92 |
| 10,179,872 B2 * | 1/2019 | Zha | C09K 8/035 |
| 2006/0234870 A1 * | 10/2006 | McCabe | C09K 8/54 |
| | | | 507/203 |
| 2010/0130641 A1 * | 5/2010 | Findlay | C08F 290/062 |
| | | | 523/205 |
| 2011/0114387 A1 | 5/2011 | Belcher et al. | |
| 2012/0048554 A1 | 3/2012 | Hughes et al. | |
| 2012/0190593 A1 * | 7/2012 | Soane | C04B 20/1048 |
| | | | 507/111 |
| 2013/0225458 A1 | 8/2013 | Qin et al. | |
| 2014/0187451 A1 * | 7/2014 | Tamsilian | C09K 8/588 |
| | | | 507/213 |
| 2016/0145459 A1 * | 5/2016 | Klein | B01J 13/18 |
| | | | 504/359 |
| 2019/0031951 A1 * | 1/2019 | Johnson | C09K 8/706 |

OTHER PUBLICATIONS

Canadian Office Action for Application No. 2,995,338 dated Oct. 1, 2019.

* cited by examiner

CORE-SHELL PARTICLES FOR TREATMENT OF SUBTERRANEAN FORMATIONS

BACKGROUND

During the treatment of subterranean formations for petroleum extraction, the use of precise chemical compositions downhole is important for a wide variety of purposes. Current techniques expose all chemical components of a composition for use downhole to tubulars and to other materials downhole en route to a desired location with limited or no ability to control or modulate the concentration or reactivity of particular chemical components on their way to a target location. For example, treatment of subterranean formations with acid can include using pure, emulsified, or gelled forms of acid, each of which present disadvantages such as corrosion, premature reaction, and low efficiency.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
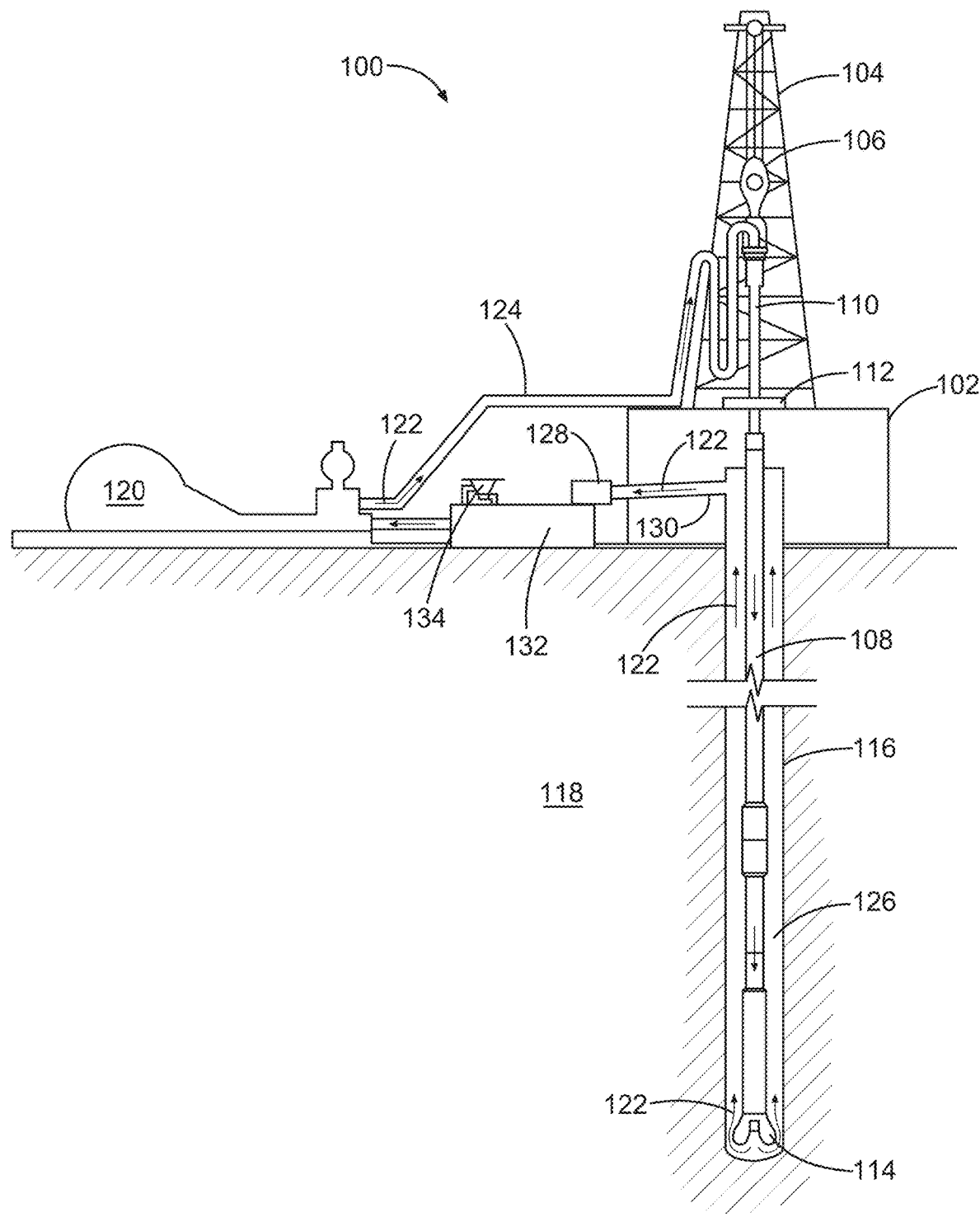
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are positive integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, naphthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in the subterranean formation a composition including a core-shell particle. The core-shell particle includes a hydrophilic core and a hydrophobic shell.

In various embodiments, the present invention provides a method of treating a subterranean formation. The method includes placing in the subterranean formation a composition including a core-shell particle. The core-shell particle includes a hydrophilic core including a polymer including repeating units having the structure:

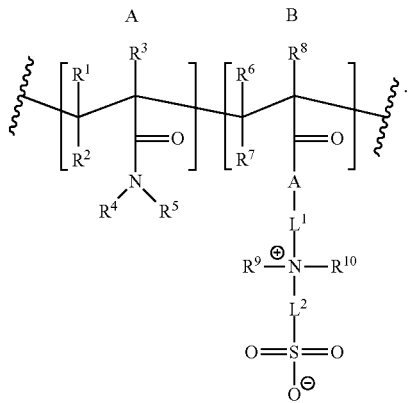

At each occurrence repeating units A and B independently occur in the direction shown or in the opposite direction. Repeating units A and B have a block or random copolymer arrangement. The variables $R^1$, $R^2$, $R^3$, $R^4$, and $R^5$ are each independently selected from —H, halo, and substituted or unsubstituted ($C_1$-$C_5$)hydrocarbyl interrupted by 0, 1, 2, or 3 groups independently selected from —O—, —S—, and substituted or unsubstituted —NH—. The variable -A- is —O— or —NH—. The variables $R^6$, $R^7$, $R^8$, $R^9$, $R^{10}$ are each independently chosen from —H, halo, and substituted or unsubstituted ($C_1$-$C_5$)hydrocarbyl interrupted by 0, 1, 2, or 3 groups independently selected from —O—, —S—, and substituted or unsubstituted —NH—. The variables $L^1$ and $L^2$ are each independently chosen from substituted or unsubstituted ($C_1$-$C_5$)hydrocarbylene interrupted by 0, 1, 2, or 3 groups independently selected from —O—, —S—, and substituted or unsubstituted —NH—. Repeating unit A is about 1 mol % to about 90 mol % of the polymer in the hydrophilic core. Repeating unit B is about 10 mol % to about 99 mol % of the polymer in the hydrophilic core. The hydrophilic core also includes a hydrophilic payload including an acid, a base, a catalyst, a crosslinker, a breaker, a hydrophilic polymer, or a combination thereof. The core-shell particle also includes a hydrophobic shell covering about 50% to about 100% of the surface area of the hydrophilic core. The hydrophobic shell includes a polymer that includes a) a repeating group that is formed by polymerization of a $(C_2$-$C_{20})$alkenyl-substituted $(C_6$-$C_{50})$aryl group, wherein the $(C_6$-$C_{50})$aryl group is substituted or unsubstituted; b) a repeating group formed by polymerization of a substituted or unsubstituted $(C_1$-$C_{50})$hydrocarbyl ester of a $(C_1$-$C_{50})$alkenyl-C(O)OH, wherein the $(C_1$-$C_{50})$ hydrocarbyl is optionally interrupted by 0, 1, 2, or 3 groups independently selected from —O—, —S—, substituted or unsubstituted —NH—, —(CH$_2$—CH$_2$—O)$_{n8}$—, and —(CH$_2$—CH$_2$—CH$_2$—O)$_{n8}$—, wherein n8 is about 1 to about 10,000; or a combination of a) and b). The method also includes releasing the payload from the core-shell particle in the subterranean formation, including releasing or removing the core from at least part of the shell.

In various embodiments, the present invention provides a system including a tubular disposed in a subterranean formation. The system also includes a pump configured to pump a composition including a core-shell particle in the subterranean formation through the tubular. The core-shell particle includes a hydrophilic core and a hydrophobic shell.

In various embodiments, the present invention provides a core-shell particle for treatment of a subterranean formation. The core-shell particle includes a hydrophilic core and a hydrophobic shell. Various embodiments provide a composition for treatment of a subterranean formation including at least one of the core-shell particles.

In various embodiments, the present invention provides a core-shell particle for treatment of a subterranean formation. The core-shell particle includes a hydrophilic core. The hydrophilic core includes a polymer including repeating units having the structure:

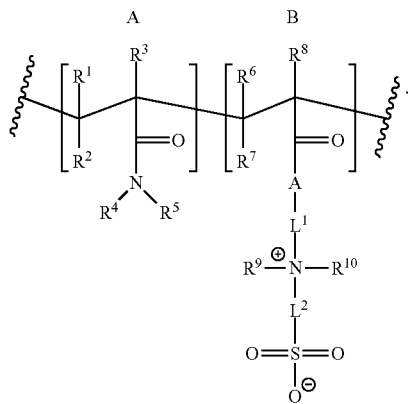

At each occurrence repeating units A and B independently occur in the direction shown or in the opposite direction. Repeating units A and B have a block or random copolymer arrangement. The variables $R^1$, $R^2$, $R^3$, $R^4$, and $R^5$ are each independently selected from —H, halo, and substituted or unsubstituted $(C_1$-$C_5)$hydrocarbyl interrupted by 0, 1, 2, or 3 groups independently selected from —O—, —S—, and substituted or unsubstituted —NH—. The variable -A- is —O— or —NH—. The variables $R^6$, $R^7$, $R^8$, $R^9$, $R^{10}$ are each independently chosen from —H, halo, and substituted or unsubstituted $(C_1$-$C_5)$hydrocarbyl interrupted by 0, 1, 2, or 3 groups independently selected from —O—, —S—, and substituted or unsubstituted —NH—. The variables $L^1$ and $L^2$ are each independently chosen from substituted or unsubstituted $(C_1$-$C_5)$hydrocarbylene interrupted by 0, 1, 2, or 3 groups independently selected from —O—, —S—, and substituted or unsubstituted —NH—. Repeating unit A is about 1 mol % to about 90 mol % of the polymer in the hydrophilic core. Repeating unit B is about 10 mol % to about 99 mol % of the polymer in the hydrophilic core. The hydrophilic core also includes a hydrophilic payload including an acid, a base, a catalyst, a crosslinker, a breaker, a hydrophilic polymer, or a combination thereof. The core-shell particle also includes a hydrophobic shell covering about 50% to about 100% of the surface area of the hydrophilic core. The hydrophobic shell includes a) a polymer that includes a repeating group that is formed by polymerization of a $(C_2$-$C_{20})$alkenyl-substituted $(C_6$-$C_{50})$ aryl group, wherein the $(C_6$-$C_{50})$aryl group is substituted or unsubstituted; b) a repeating group formed by polymerization of a substituted or unsubstituted $(C_1$-$C_{50})$hydrocarbyl ester of a $(C_1$-$C_{50})$alkenyl-C(O)OH, wherein the $(C_1$-$C_{50})$ hydrocarbyl is optionally interrupted by 0, 1, 2, or 3 groups independently selected from —O—, —S—, substituted or unsubstituted —NH—, —(CH$_2$—CH$_2$—O)$_{n8}$—, and —(CH$_2$—CH$_2$—CH$_2$—O)$_{n8}$—, wherein n8 is about 1 to about 10,000; or a combination of a) and b). Various embodiments provide a composition for treatment of a subterranean formation including at least one of the core-shell particles.

In various embodiments, the present invention provides a method of preparing a composition for treatment of a subterranean formation. The method includes forming a composition including a core-shell particle. The core-shell particle includes a hydrophilic core and a hydrophobic shell.

Certain embodiments of the present invention provide certain advantages over other methods of treating subterranean formations, at least some of which are unexpected. For example, in various embodiments, the present invention provides core-shell particles having a stable hydrophobic shell on a hydrophilic core. In various embodiments, a wide variety of payload materials can be included in the hydrophilic core of the core-shell particles. In various embodiments, the payload material can be partially or fully isolated from the surroundings by the hydrophobic shell, providing a wide variety of advantages over placing the unisolated (e.g., unencapsulated) payload material downhole. For example, in various embodiments, the payload in the core-shell particle can be more effective for the intended use in the subterranean formation than if injected alone, avoiding consumption and dilution during transit to a desired location. In various embodiments, a payload contained in the core-shell particle can be easier to handle as compared to the unencapsulated payload. In various embodiments, the shell can partially or fully protect sensitive, volatile, or reactive payloads from undesired reaction or loss to the environment during transit. In various embodiments, an acid payload in the core-shell particle can be prevented from indiscriminately degrading wellbore components, such as tubulars, casings, pipes, and the like. In various embodiments, an acid payload in the core-shell particle can penetrate further into a subterranean formation before being spent, such as into a fracture, as compared to free, emulsified, or gelled acids, providing larger and longer flowpaths which can increase production.

In various embodiments, various features of the core-shell particles can be controlled and customized such that the core-shell particles perform in a desired fashion under particular subterranean conductions. In various embodiments, the shell of the core-shell particle can be designed to provide a particular degree of colloidal stability with surrounding materials, such as to provide a particular degree of suspension of the core-shell particles in solution or lack thereof. In various embodiments, the particle size of the core-shell particles can be controlled, thereby controlling the permeability of the particles through materials or varying porosity, allowing customization toward a wide variety of applications, including stimulation, enhanced oil recovery, and fluid loss control. In various embodiments, by varying various characteristics of the core-shell particle, the release mechanism can be customized to a particular desired application, such as customization toward release of the payload under desired external stimuli. In various embodiments, the shell thickness of the core-shell particle can be easily controlled to provide desired properties. In various embodiments, the morphology of the surface of the core-shell particle can be varied to provide specific desired properties. In various embodiments, the degree of hydrophobicity of the shell of the core-shell particles can be controlled by varying the composition of the shell, and by varying the completeness of the coverage of the shell on the core. In various embodiments, the degree of hydrophilicity of the core of the core-shell particles can be controlled by varying the composition of the core, allowing for customization toward particular payload materials, and allowing for customization of the dissolution or swelling rate of the core. In various embodiments, the composition of the core of the core-shell particles can be adjusted such that the hydrolysis rate in the presence of acidic or basic payloads is slow, such that the core-shell particles can be stored with the cargo therein for an extended period before use without significant degradation. In various embodiments, the shell and the polymers of the core can be a minor proportion of the weight of the particle compared to the payload material, such that upon release of the payload the remaining polymeric residues can be small.

In various embodiments, the core-shell particles can be synthesized easily, quickly, and at low cost. In various embodiments, the core-shell particles can be synthesized in a convenient one-pot reaction. In various embodiments, the starting materials for synthesis of the core-shell particles can be inexpensive.

In various embodiments, the core-shell particles may be reused, such as in a circulating system such as drilling fluid, such as if the particles are sized small enough to pass through solids control equipment. In various embodiments, unreacted (e.g., unbroken) particles can be recovered via filtration. In various embodiments, reuse or recovery can make solids disposal in drilling operations less costly if release of the encapsulated chemicals is of environmental concern. In various embodiments, the encapsulation provided by the core-shell particles can provide enhanced safety of workers on-site from the encapsulated materials. In various embodiments, following delivery of acid or other materials from the core-shell particles, the core or shell or both can dissolve. In various embodiments, the dissolved core, dissolved shell, or both, can provide enhanced oil recovery.

Method of Treating a Subterranean Formation.

In some embodiments, the present invention provides a method of treating a subterranean formation. The method includes placing in a subterranean formation a composition including a core-shell particle that includes a hydrophilic core and a hydrophobic shell. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In some embodiments, the method includes obtaining or providing the composition including the core-shell particle. The obtaining or providing of the composition can occur at any suitable time and at any suitable location. The obtaining or providing of the composition can occur above the surface (e.g., one or more components of the composition can be combined above the surface). The obtaining or providing of the composition can occur in the subterranean formation (e.g., one or more components of the composition can be combined downhole).

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway.

In some embodiments, the method can be a method of enhanced oil recovery. The method can include sweeping or displacing oil in the subterranean formation toward a well. For example, the method can include placing the composition in a subterranean formation downhole via an injection wellbore. In some examples, the placing of the composition in the subterranean formation includes contacting the composition with or placing the composition in at least one of a production zone (e.g., a pay zone), a flow pathway, and an area surrounding a flow pathway. The method can include extracting material including petroleum from the subterranean formation downhole via the production wellbore. In some embodiments, the core-shell particle can have a core that is soluble in hydrocarbons, which can dissolve and deliver cargo once hydrocarbons are encountered downhole, such as wetting agents, surfactants, acids, viscosifiers, cross-linkers, or inhibitors for paraffin, scale, or asphaltenes. In some embodiments, after the shell dissolves, depending on the hydrophilicity of the core and the polarity of the surrounding hydrocarbon phase, the hydrophilic core can form a suspension with hydrocarbon phase or can migrate to a water phase (e.g., for delivery of viscosifiers or cross-linkers). In some embodiments, the core-shell particle can be driven deep into the target formation. In other embodiments, the core-shell particle can deposit cargo near the wellbore, such as for flow-assurance applications.

In some embodiments, the composition can be an acidizing fluid, an enhanced oil recovery fluid, a fracturing fluid, a drilling fluid, a pill, a remedial treatment fluid, logging fluid, or a combination thereof. In various embodiments, the method includes acidizing, performing enhanced oil recovery, fracturing, drilling, fluid loss control, logging, or a combination thereof.

In some embodiments, the method includes at least partially releasing the core from the shell (e.g., or at least partially releasing the shell from the core). The core can optionally include a payload material. The method can include at least partially releasing the payload material. At least partially releasing the payload material can include at least partially releasing the core from the shell, to allow the materials in the core to enter the external environment. In some embodiments, the core can be dissolved or swollen by the external environment upon release from the shell. In other embodiments, the core experiences little to no change after release from the shell, other than payload material being dispersed from therein to the external environment. Releasing the core from the shell can include crushing the core-shell particle, breaking or dislodging at least part of the shell from the core, dissolving at least part of the shell, swelling the core and releasing at least part of the shell from the core, or a combination thereof. Releasing the shell from the core can include exposing the core-shell particle to compression, crushing, grinding, shear, dissolving solvent, internal pressure from a swelling core, high temperature, external pressure, or non-neutral pH.

Core-Shell Particle.

The core-shell particle includes a hydrophilic core and a hydrophobic shell. In various embodiments, the only components of the core-shell particle are the hydrophilic core (which can optionally include a payload) and the hydrophobic shell. The core-shell particle can have any suitable particle size, wherein particle size can be the largest dimension of the particle. For example, the core-shell particle can have a particle size of about 100 nm to about 1 mm, about 250 nm to about 10 microns, about 500 nm to about 5 microns, or about 100 nm or less, or about 150 nm, 200, 250, 300, 400, 500, 600, 700, 800, 900, 1,000, 1,250, 1,500, 1,750, 2,000, 2,250, 2,500, 2,750, 3,000, 3,250, 3,500, 3,750, 4,000, 4,250, 4,500, 4,750, 5,000, 5,500 nm, 6 microns, 7, 8, 9, 10, 12, 14, 16, 18, 20, 25, 30, 35, 40, 45, 50, 60, 70, 80, 90, 100, 150, 200, 250, 500, 750, or about 1,000 microns or more.

The core-shell particle can have any suitable shape, provided the method can be carried out as described herein. The core-shell particle can be spherical, or approximately spherical.

In some embodiments, the core-shell particle can include a payload, such as a material intended to have a specific effect when released downhole. For example, the payload can include an acid, and the composition can be an acidizing fluid, an enhanced oil recovery fluid (e.g., for sandstone or carbonate-containing reservoirs), a remedial treatment fluid, or a combination thereof. In an example, the payload can include a crosslinker, a breaker, a hydrophilic polymer, or a combination thereof, wherein the composition is a fracturing fluid. In some embodiments, the core-shell particle can be free of a payload, wherein the core itself is intended to have a specific effect when released from the shell downhole (e.g., clogging of pores or flowpaths, fluid loss prevention, with optional swelling of the released cores).

The payload can be any suitable payload. The core can include one payload, or multiple payloads. The one or more payload materials can form any suitable proportion of the core, such as about 0.01 wt % to about 99 wt % of the core, about 5 wt % to about 95 wt %, or about 0.01 wt % or less, or about 0.1 wt %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98 wt %, or about 99 wt % or more.

The payload can be a hydrophilic payload, such that it is compatible with the core and can be absorbed by the core during loading of the payload into the core or formation of the core with the payload therein. In various embodiments, the payload can be a curable material, an encapsulated resin, a resin, a Portland cement, a pozzolana cement, a gypsum cement, a high alumina content cement, a slag cement, a silica cement, a cementitious kiln dust, fly ash, metakaolin, shale, zeolite, a set retarding additive, a corrosion inhibitor, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, an acidity control agent, a density control agent, a density modifier, an emulsifier, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof. The payload can be an acid, a base, a catalyst, a crosslinker, a breaker, a hydrophilic polymer (e.g., polymers such as polyacrylamide, polyvinyl alcohol, or zwitterionic polymers, such as to enhance oil recovery, increase viscosity, or provide friction/drag reduction), or a combination thereof. The payload can be an acid, such as hydrochloric acid, sulfuric acid, nitric acid, hydrofluoric acid, acetic acid, formic acid, or a combination thereof. The acid can have any suitable strength, such as about 0.01 vol % to about 100 vol % in water, or about 0.01 vol % or less, or about 0.1 vol %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 100 vol %.

Hydrophilic Core.

The core-shell particle includes a hydrophilic core. The hydrophilic core, including any payload therein, can form any suitable proportion of the core-shell particle, such as about 1 wt % to about 99.999 wt %, or about 1 wt % or less, or about 2 wt %, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more.

The hydrophilic core can include a hydrophilic polymer, such as an uncrosslinked hydrophilic polymer, a crosslinked hydrophilic polymer, or a hydrophilic polymer network. The hydrophilic polymer can be a hydrogel. The hydrophilic polymer in the core of the core-shell particle can be swollen with solvent or payload materials, or the hydrophilic polymer can be substantially non-swollen. The hydrophilic core can include one hydrophilic polymer, or multiple hydrophilic polymers. The one or more hydrophilic polymers can form any suitable wt % of the core, such as about 0.001 wt % to about 99.999 wt %, or about 0.001 wt % or less, or about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more. The one or more hydrophilic polymers and any payload present can form any suitable wt % of the core, such as about 1 wt % to about 99.999 wt %, about 50 wt % to about 100 wt %, about 100 wt %, or about 50 wt % or less, or about 55 wt %, 60, 65, 70, 75, 80, 82, 84, 86, 88, 90, 91, 92, 93, 94, 95, 96, 97, 98, 99, 99.9, 99.99 wt %, or about 99.999 wt % or more. The hydrophilic polymer (e.g., not considering inter-polymer crosslinks) can have any suitable molecular weight, such as about 100 to about 20,000,000, or about 1,000 to about 1,000,000, or about 100 or less, or about 200, 300, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 15,000,000, or about 20,000,000 or more.

The hydrophilic polymer can include a polymer including a repeating unit having the structure:

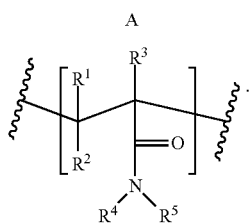

The variables $R^1$, $R^2$, $R^3$, $R^4$, and $R^5$ can be each independently selected from —H, halo, and substituted or unsubstituted $(C_1$-$C_5)$hydrocarbyl interrupted by 0, 1, 2, or 3 groups independently selected from —O—, —S—, and substituted or unsubstituted —NH—. The variables $R^1$, $R^2$, $R^3$, $R^4$, and $R^5$ can be each independently selected from —H and substituted or unsubstituted $(C_1$-$C_5)$hydrocarbyl. The variables $R^1$, $R^2$, $R^3$, $R^4$, and $R^5$ can be each independently selected from —H and $(C_1$-$C_8)$alkyl. The variables $R^1$, $R^2$, $R^4$, and $R^5$ can be —H, and $R^3$ can be —H or methyl. The variables $R^1$, $R^2$, $R^3$, $R^4$, and $R^5$ can each be —H. Repeating unit A can be about 0 mol % to about 100 mol % of the hydrophilic core polymer, or about 0 mol % to about 99 mol %, or about 1 mol % to about 90 mol %, or about 0 mol %, or about 1 mol % or less, or about 2 mol %, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98 mol %, or about 99 mol % or more. The hydrophilic polymer can include a polymer including a repeating unit having the structure:

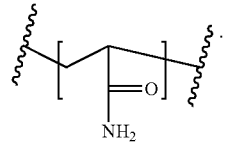

The hydrophilic core can include a polymer including at least one repeating unit that has a zwitterionic structure. The repeating unit having a zwitterionic structure can be about 0 mol % to about 100 mol % of the polymer in the hydrophilic core, 1 mol % to about 100 mol %, about 10 mol % to about 99 mol %, or about 1 mol % or less, or equal to or greater than about 2 mol %, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 mol % or about 99.999 mol % or more.

The hydrophilic polymer can include a polymer including a repeating unit having the structure:

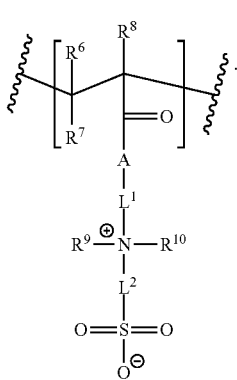

The variable -A- can be —O— or —NH—. The variables $R^6$, $R^7$, $R^8$, $R^9$, $R^{10}$ can be each independently chosen from —H, halo, and substituted or unsubstituted $(C_1$-$C_5)$hydrocarbyl interrupted by 0, 1, 2, or 3 groups independently selected from —O—, —S—, and substituted or unsubstituted —NH—. The variables $R^6$, $R^7$, $R^8$, $R^9$, $R^{10}$ can be each independently chosen from —H and $(C_1$-$C_5)$hydrocarbyl. The variables $R^6$, $R^7$, $R^8$, $R^9$, $R^{10}$ can be each independently chosen from —H and $(C_1$-$C_5)$alkyl. The variables $R^6$, $R^7$ can be —H, and the variables $R^8$, $R^9$, $R^{10}$ can be methyl. The variables $L^1$ and $L^2$ can be each independently chosen from substituted or unsubstituted $(C_1$-$C_8)$hydrocarbylene interrupted by 0, 1, 2, or 3 groups independently selected from —O—, —S—, and substituted or unsubstituted —NH—. The variables $L^1$ and $L^2$ can be each independently chosen from $(C_1$-$C_8)$hydrocarbylene. The variables $L^1$ and $L^2$ can be each independently $(C_1$-$C_5)$alkylene. The variables $L^1$ and $L^2$ can each be independently selected from ethylene and propylene.

The hydrophilic polymer can include a polymer including a repeating unit having the structure:

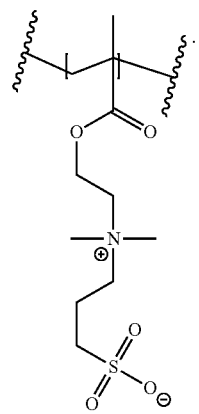

The hydrophilic core can include a polymer including a repeating unit that is formed from N-(2-methacryloyloxy) ethyl-N,N-dimethyl-ammonio propanesulfonate (SPE), having the structure:

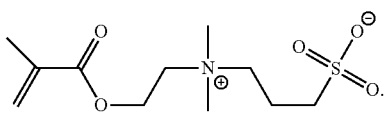

The hydrophilic polymer can include a polymer including a repeating unit having the structure:

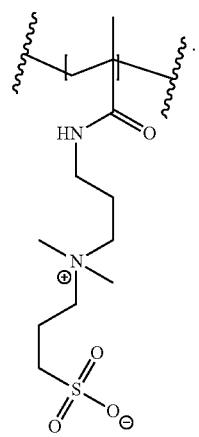

The hydrophilic core can include a polymer including a repeating unit that is formed from N-(3-methacryloylamino) propyl-N,N-dimethyl-ammonio propanesulfonate (SPP), having the structure:

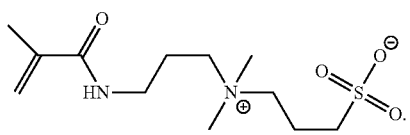

The hydrophilic polymer can include a polymer including a repeating unit having the structure:

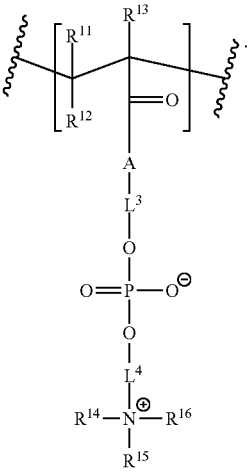

The variable -A- can be —O— or —NH—. The variables $R^{11}$, $R^{12}$, $R^{13}$, $R^{14}$, $R^{15}$, $R^{16}$ can be each independently chosen from —H, halo, and substituted or unsubstituted $(C_1-C_5)$hydrocarbyl interrupted by 0, 1, 2, or 3 groups independently selected from —O—, —S—, and substituted or unsubstituted —NH—. The variables $R^{11}$, $R^{12}$, $R^{13}$, $R^{14}$, $R^{15}$, $R^{16}$ can be each independently chosen from —H and $(C_1-C_5)$hydrocarbyl. The variables $R^{11}$, $R^{12}$, $R^{13}$, $R^{14}$, $R^{15}$, $R^{16}$ can be each independently chosen from —H and $(C_1-C_5)$alkyl. The variables $R^{11}$ and $R^{12}$ can be —H, and $R^{13}$, $R^{14}$, $R^{15}$, $R^{16}$ can be methyl. The variables $L^3$ and $L^4$ can be each independently chosen from substituted or unsubstituted $(C_1-C_8)$hydrocarbylene interrupted by 0, 1, 2, or 3 groups independently selected from —O—, —S—, and substituted or unsubstituted —NH—. The variables $L^3$ and $L^4$ can be $(C_1-C_5)$hydrocarbylene. The variables $L^3$ and $L^4$ can be $(C_1-C_5)$alkylene. The variables $L^3$ and $L^4$ can be propylene.

The hydrophilic polymer can include a polymer including a repeating unit having the structure:

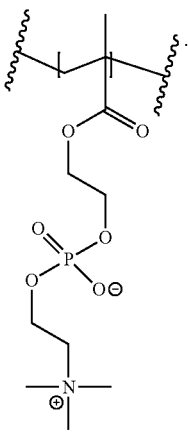

The hydrophilic core can include a polymer including a repeating unit that is formed from 2-(methacryloyloxy) ethylphosphatidylcholine (MPC), having the structure:

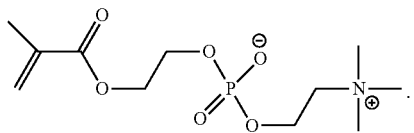

The hydrophilic polymer can include a polymer including a repeating unit having the structure:

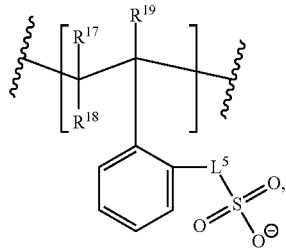

The variables $R^{17}$, $R^{18}$, and $R^{19}$ can be each independently chosen from —H, halo, and substituted or unsubstituted $(C_1-C_5)$hydrocarbyl interrupted by 0, 1, 2, or 3 groups independently selected from —O—, —S—, and substituted or unsubstituted —NH—. The variables $R^{17}$, $R^{18}$, and $R^{19}$ can be each independently chosen from H and $(C_1-C_5)$ hydrocarbyl. The variables $R^{17}$, $R^{18}$, and $R^{19}$ can be each independently chosen from —H and $(C_1-C_5)$alkyl. The variables $R^{17}$, $R^{18}$, and $R^{19}$ can be each —H. The variable $L^5$ can be independently substituted or unsubstituted $(C_1-C_5)$hydrocarbylene interrupted by 0, 1, 2, or 3 groups independently selected from —O—, —S—, and substituted or unsubstituted —NH—. The variable $L^5$ can be $(C_1-C_8)$ hydrocarbyl. The variable $L^5$ can be $(C_1-C_5)$alkylene. The variable $L^5$ can be propylene.

The hydrophilic polymer can include a polymer including a repeating unit having the structure:

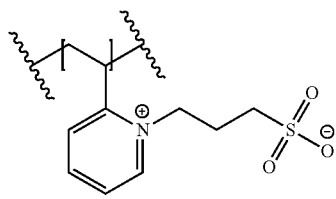

The hydrophilic core can include a polymer including a repeating unit that is formed from 3-(2'-vinyl-pyridinio) propanesulfonate (SPV), having the structure:

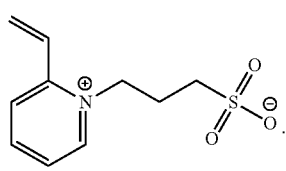

The hydrophilic polymer can include a polymer including a repeating unit having the structure:

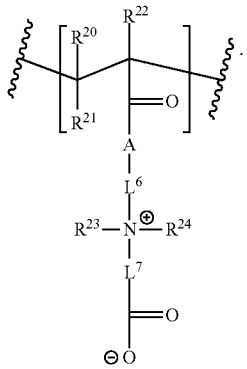

The variable -A- can be —O— or —NH—. The variables $R^{20}$, $R^{21}$, $R^{22}$, $R^{23}$, $R^{24}$, $R^{25}$ can each independently be chosen from —H, halo, and substituted or unsubstituted $(C_1-C_5)$hydrocarbyl interrupted by 0, 1, 2, or 3 groups independently selected from —O—, —S—, and substituted or unsubstituted —NH—. The variables $R^{20}$, $R^{21}$, $R^{22}$, $R^{23}$, $R^{24}$, $R^{25}$ can be each independently chosen from —H and $(C_1-C_5)$hydrocarbyl. The variables $R^{20}$, $R^{21}$, $R^{22}$, $R^{23}$, $R^{24}$, $R^{25}$ can be each independently chosen from —H and $(C_1-C_5)$alkyl. The variables $R^{20}$ and $R^{21}$ can be —H, $R^{22}$ can be —H or methyl, and $R^{23}$, $R^{24}$, and R can be methyl. The variables $L^6$ and $L^7$ can be each independently chosen from substituted or unsubstituted $(C_1-C_5)$hydrocarbylene interrupted by 0, 1, 2, or 3 groups independently selected from —O—, —S—, and substituted or unsubstituted —NH—. The variables $L^6$ and $L^7$ can be $(C_1-C_5)$hydrocarbylene. The variables $L^6$ and $L^7$ can be $(C_1-C_5)$alkylene. The variables $L^6$ and $L^7$ can be independently selected from ethylene and propylene.

The hydrophilic polymer can include a polymer including a repeating unit having the structure:

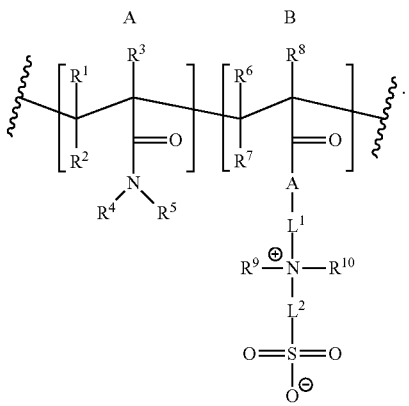

At each occurrence repeating units A and B independently occur in the direction shown or in the opposite direction. Repeating units A and B can have a block or random copolymer arrangement. The variables $R^1$, $R^2$, $R^3$, $R^4$, and $R^5$ can be each independently selected from —H, halo, and substituted or unsubstituted $(C_1-C_8)$hydrocarbyl interrupted by 0, 1, 2, or 3 groups independently selected from —O—, —S—, and substituted or unsubstituted —NH—. The variable -A- can be —O— or —NH—. The variables $R^6$, $R^7$, $R^8$, $R^9$, $R^{10}$ can be each independently chosen from —H, halo, and substituted or unsubstituted $(C_1-C_5)$hydrocarbyl interrupted by 0, 1, 2, or 3 groups independently selected from —O—, —S—, and substituted or unsubstituted —NH—. The variables $L^1$ and $L^2$ can be each independently chosen from substituted or unsubstituted $(C_1$-$C_5)$hydrocarbylene interrupted by 0, 1, 2, or 3 groups independently selected from —O—, —S—, and substituted or unsubstituted —NH—. Repeating unit A can be about 1 mol % to about 90 mol % of the polymer in the hydrophilic core. Repeating unit B can be about 10 mol % to about 99 mol % of the polymer in the hydrophilic core.

The hydrophobic polymer can be crosslinked via a polyvinyl monomer chosen from a $(C_1$-$C_{20})$alkylenebiacrylamide (e.g., methylenebisacrylamide), a poly(($(C_1$-$C_{20})$alkenyl)-substituted mono- or poly-$(C_1$-$C_{20})$alkyl ether (e.g., pentaerythritol allyl ether), a poly($C_2$-$C_{20}$)alkenylbenzene (e.g., divinylbenzene), pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, and combinations thereof. The polymer can include one polyvinyl crosslinker, or multiple polyvinyl crosslinkers. The one or more polyvinyl crosslinkers can form any suitable mol % of the polymer, such as about 0.001 mol % to about 50 mol %, or about 0.001 mol % or less, or about 0.01 mol %, 0.1, 1, 2, 3, 4, 5, 6, 8, 10, 12, 14, 16, 18, 20, 25, 30, 35, 40, 45, or about 50 mol % or more.

The hydrophobic polymer can include a stabilizer, such as polyvinylpyrrolidone (PVP) or polyvinyl alcohol (PVA). The stabilizer can stabilize particles during dispersion polymerization. The stabilizer can form any suitable mol % of the polymer, such as about 0.001 mol % to about 50 mol %, or about 0.001 mol % or less, or about 0.01 mol %, 0.1, 1, 2, 3, 4, 5, 6, 8, 10, 12, 14, 16, 18, 20, 25, 30, 35, 40, 45, or about 50 mol % or more.

Hydrophobic Shell.

The core-shell particle includes a hydrophobic shell. The hydrophobic shell can have any suitable thickness, such as about 1 nm to about 10 microns, about 10 nm to about 1 micron, or about 1 nm or less, or about 2, 3, 4, 5, 6, 7, 8, 9, 10, 12, 14, 16, 18, 20, 30, 40, 50, 60, 70, 80, 90, 100, 150, 200, 250, 300, 400, 500, 600, 700, 800, 900 nm, 1 micron, 1.5, 2, 2.5, 3, 3.5, 4, 4.5, 5, 6, 7, 8, 9, or about 10 microns or more. The shell can completely cover the core, or the shell can be porous or include one or more holes therein. The shell can cover any suitable amount of the surface area of the hydrophilic core, such as about 50% to about 100% of the surface area of the hydrophilic core, about 90% to about 100% of the surface area of the hydrophilic core, or about 50% or less, or about 55%, 60, 65, 70, 75, 80, 82, 84, 86, 88, 90, 91, 92, 93, 94, 95, 96, 97, 98% or about 99% or more of the surface area of the hydrophilic core. The shell can have any suitable morphology. In some embodiments, the shell can have a substantially smooth surface. In some embodiments, the shall can have a rough or dimpled surface. The shall can form any suitable proportion of the overall weight of the core-shell particle, such as about 0.001 wt % to about 99 wt % of the core-shell particle, or about 0.001 wt % or less, or about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98 wt %, or about 99 wt % or more.

The hydrophobic shell can include a polymer including at least one repeating group that is hydrophobic. The polymer including the at least one repeating group that is hydrophobic can form any suitable proportion of the overall weight of the shell, such as about 50 wt % to about 100 wt % of the hydrophobic shell, about 100 wt %, or about 50 wt % or less, or about 55 wt %, 60, 65, 70, 75, 80, 82, 84, 86, 88, 90, 91, 92, 93, 94, 95, 96, 97, 98, 99, 99.9, 99.99 wt % or about 99.999 wt % or more. The at least one repeating group that is hydrophobic can form any suitable mol % of the hydrophobic polymer, such as about 10 mol % to about 100 mol % of the polymer in the hydrophobic shell, or about 100 mol %, or about 10 mol % or less, or about 12 mol %, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 mol %, or about 99.999 mol % or more. The polymer (e.g., not considering inter-polymer crosslinks) can have any suitable molecular weight, such as about 100 to about 20,000,000, or about 1,000 to about 1,000,000, or about 100 or less, or about 200, 300, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 15,000,000, or about 20,000,000 or more.

The hydrophobic shell can include a polymer including a repeating group formed by polymerization of any suitable ethylenically-unsaturated monomer, wherein the ethylene group can be unsubstituted or substituted with a suitable hydrophobic substituent. The hydrophobic shell can include a polymer including a repeating group formed from vinyl chloride, vinylene dichloride, acrylamide or derivatives thereof. The hydrophobic shell can include a polyacrylamide or a partially hydrolyzed polyacrylamide. The hydrophobic shell can include a polysiloxane, polyolefin (e.g., poly (acrylic acid) or an ester thereof, polystyrene, poly(vinyl acetate), poly(vinyl ester), poly(vinyl ether), poly(vinyl ketone), poly(vinyl chloride), poly(vinylidene chloride)), fluorocarbon, polycarbonate, or a combination thereof. The hydrophobic shell can include a polymer including a repeating group that is formed by polymerization of a $(C_2$-$C_{20})$alkenyl-substituted $(C_6$-$C_{50})$aryl group, wherein the $(C_6$-$C_{50})$aryl group is substituted or unsubstituted. The repeating group can be formed by polymerization of a vinyl-substituted phenyl group, wherein the phenyl group is substituted or unsubstituted. The repeating group can be formed by polymerization of styrene.

The hydrophobic shell can include a polymer including a repeating group that is formed by polymerization of a substituted or unsubstituted $(C_1$-$C_{50})$hydrocarbyl ester of a $(C_1$-$C_{50})$alkenyl-C(O)OH, wherein the $(C_1$-$C_{50})$hydrocarbyl is optionally interrupted by 0, 1, 2, or 3 groups independently selected from —O—, —S—, substituted or unsubstituted —NH—, —$(CH_2$—$CH_2$—$O)_{n8}$—, and —$(CH_2$—$CH_2$—$CH_2$—$O)_{n8}$—, wherein n8 is about 1 to about 10,000. The repeating group can be formed by polymerization of a substituted or unsubstituted $(C_1$-$C_{10})$alkyl ester of a substituted or unsubstituted acrylic acid. The repeating group can be formed by polymerization of methyl methacrylate. In some embodiments, the polymer can include repeating units formed from styrene and from methyl methacrylate, such as a copolymer of styrene and from methyl methacrylate.
Other Components.

The core-shell particles (e.g., the core, shell, or a combination thereof), the composition including the core-shell particles, or a mixture including the composition, can include any suitable additional component in any suitable proportion, such that the core-shell particles, composition, or mixture including the same, can be used as described herein. Any component listed in this section can be present or not present in the core-shell particle, the composition, or a mixture including the composition.

In some embodiments, the core-shell particle (e.g., the core, shell, or a combination thereof), the composition, or a mixture including the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the core-shell particle (e.g., the core, shell, or a combination thereof), the composition, or a mixture including the composition, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidemethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2-C_{10})$alkene), wherein the $(C_2-C_{10})$ alkene is substituted or unsubstituted. The viscosifier can include at least one of poly(acrylic acid) or $(C_1-C_8)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen-containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the core-shell particle (e.g., the core, shell, or a combination thereof), the composition, or a mixture including the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$ hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly$((C_1-C_{20})$alkenyl)-substituted mono- or poly-$(C_1-C_{20})$ alkyl ether (e.g., pentaerythritol allyl ether), and a poly$(C_2-C_{20})$alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the core-shell particle (e.g., the core, shell, or a combination thereof), the composition, or a mixture including the composition, about 0.001 wt % to about 0.01 wt %, or about 0.000.01 wt % or less, or about 0.000.05 wt %, 0.000.1, 0.000.5, 0.001, 0.005, 0.01, 0.05, 0.1, 0.5, 1, 2, 3, 4, or about 5 wt % or more.

In some embodiments, the core-shell particle (e.g., the core, shell, or a combination thereof), the composition, or a mixture including the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the core-shell particle (e.g., the core, shell, or a combination thereof), the composition, or a mixture including the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The core-shell particle (e.g., the core, shell, or a combination thereof), the composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2-C_{40}$ fatty acid $C_1-C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, naphthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the core-shell particle (e.g., the core, shell, or a combination thereof), the composition, or a mixture including the composition, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the core-shell particles or a mixture including the same can include any suitable downhole fluid. The composition including the core-shell particles can be combined with any suitable downhole fluid before, during, or after the placement of the composition in the subterranean formation or the contacting of the composition and the subterranean material. In some examples, the composition including the core-shell particles is combined with a downhole fluid above the surface, and then the combined composition is placed in a subterranean formation or contacted with a subterranean material. In another example, the composition including the core-shell particles is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the core-shell particle (e.g., the core, shell, or a combination thereof), the composition, or a mixture including the composition, can include any suitable amount of any suitable material used in a downhole fluid. For example, the core-shell particle (e.g., the core, shell, or a combination thereof), the composition, or a mixture including the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the core-shell particle (e.g., the core, shell, or a combination thereof), the composition, or a mixture including the composition can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQ-UITONE™ polymeric filtration agent and viscosifier; FAC-TANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the core-shell particle (e.g., the core, shell, or a combination thereof), the composition, or a mixture including the composition can include one or more additive components such as: X-TEND® II, PAC™-R, PAC™-L, LIQUI-VIS® EP, BRINEDRIL-VIS™, BARA-ZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CAR-BONOX®, and BARANEX® filtration control agents; PERFORMATROL®, GEM™, EZ-MUD®, CLAY GRAB-BER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the core-shell particle (e.g., the core, shell, or a combination thereof), the composition, or a mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the core-shell particles can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition or a mixture including the same. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the composition including the core-shell particles disclosed herein can directly or indirectly affect one or more components or pieces of equipment associated with the preparation, delivery, recapture, recycling, reuse, and/or disposal of the disclosed composition including core-shell particles. For example, and with reference to FIG. 1, the disclosed composition including core-shell particles can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including core-shell particles can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including core-shell particles can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including core-shell particles can be stored, reconditioned, and/or regulated until added to the drilling fluid 122.

As mentioned above, the composition including core-shell particles can directly or indirectly affect the components and equipment of the drilling assembly 100. For example, the composition including core-shell particles can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including core-shell particles.

The composition including core-shell particles can directly or indirectly affect the pump 120, which representatively includes any conduits, pipelines, trucks, tubulars, and/or pipes used to fluidically convey the composition including core-shell particles to the subterranean formation; any pumps, compressors, or motors (e.g., topside or downhole) used to drive the composition into motion; any valves or related joints used to regulate the pressure or flow rate of the composition; and any sensors (e.g., pressure, temperature, flow rate, and the like), gauges, and/or combinations thereof, and the like. The composition including core-shell particles can also directly or indirectly affect the mixing hopper 134 and the retention pit 132 and their assorted variations.

The composition including core-shell particles can also directly or indirectly affect the various downhole or subterranean equipment and tools that can come into contact with the composition including core-shell particles such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including core-shell particles can also directly or indirectly affect any downhole heat exchangers, valves, and corresponding actuation devices, tool seals, packers, and other wellbore isolation devices or components, and the like associated with the wellbore 116. The composition including core-shell particles can also directly or indirectly affect the drill bit 114, which can include roller cone bits, polycrystalline diamond compact (PDC) bits, natural diamond bits, hole openers, reamers, coring bits, and the like.

While not specifically illustrated herein, the composition including core-shell particles can also directly or indirectly affect any transport or delivery equipment used to convey the composition including core-shell particles to the drilling assembly 100 such as, for example, any transport vessels, conduits, pipelines, trucks, tubulars, and/or pipes used to fluidically move the composition including core-shell particles from one location to another; any pumps, compressors, or motors used to drive the composition into motion; any valves or related joints used to regulate the pressure or flow rate of the composition; and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a core-shell particle including a hydrophilic core and a hydrophobic shell. The system can also include a subterranean formation including the composition therein. In some embodiments, the composition in the system can also include or can be a downhole fluid, or the system can include a mixture of the composition and a downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for acidizing, drilling, fracturing (e.g., pre-pad, pad, slurry, or finishing stages), fluid loss control, or logging. In various embodiments, the system or apparatus can include a pump fluidly coupled to a tubular (e.g., any suitable type of oilfield pipe, such as pipeline, drill pipe, production tubing, and the like), with the tubular containing a composition including the core-shell particle described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
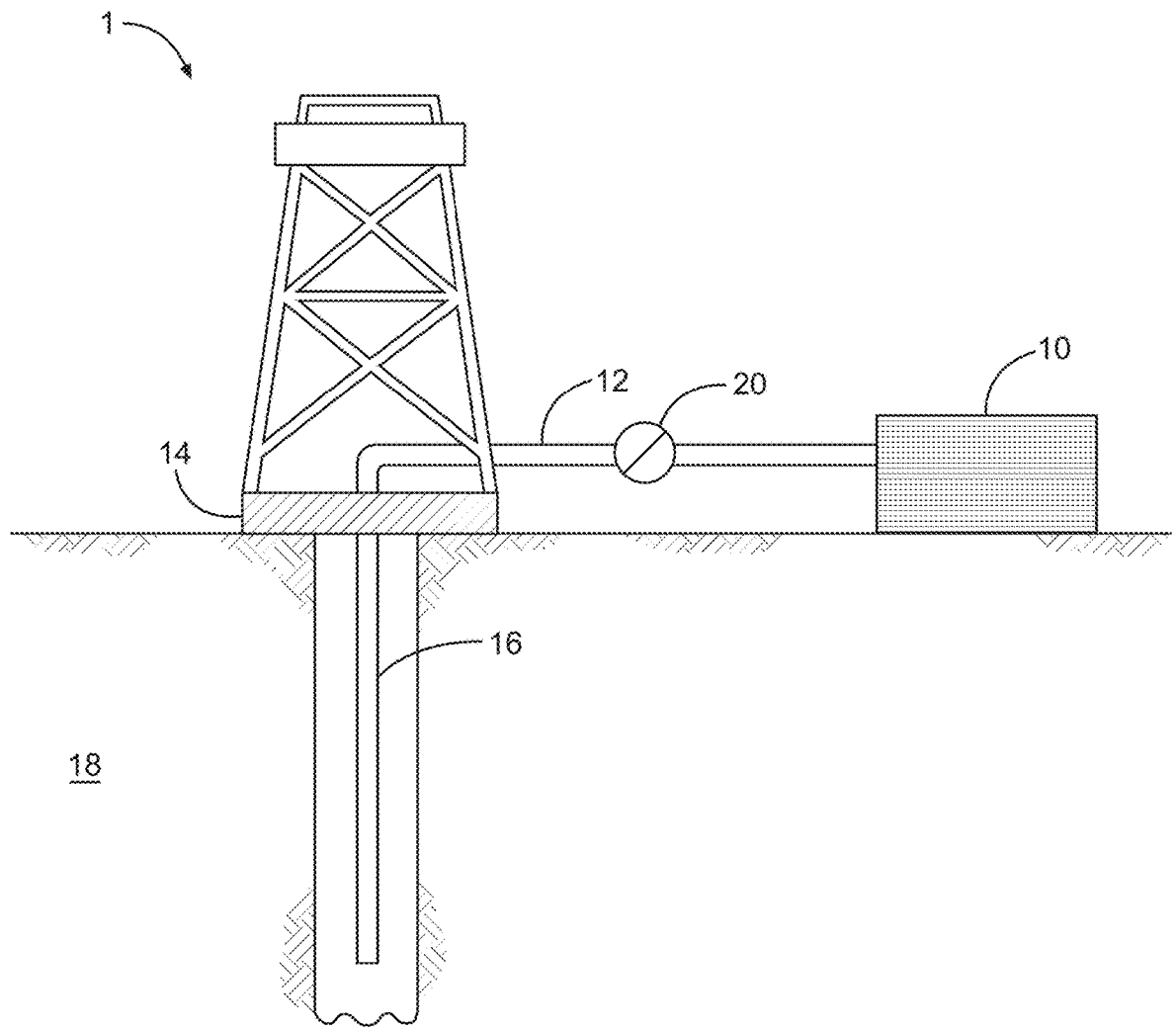
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of core-shell particles therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Core-Shell Particle for Treatment of a Subterranean Formation.

Various embodiments provide a core-shell particle for treatment of a subterranean formation. For example, the composition can include a core-shell particle including a hydrophilic core and a hydrophobic shell, such as any embodiment of a core-shell particle described herein. The core-shell particle can include a payload, or the core-shell particle can be free of a payload. Various embodiments provide a composition for treatment of a subterranean formation. The composition can be any suitable composition that includes an embodiment of the core-shell particle and that can be used to perform an embodiment of the method for treatment of a subterranean formation described herein.

In some embodiments, the present invention provides a core-shell particle for treatment of a subterranean formation. The core-shell particle can include a hydrophilic core. The hydrophilic core can include a polymer including repeating units having the structure:

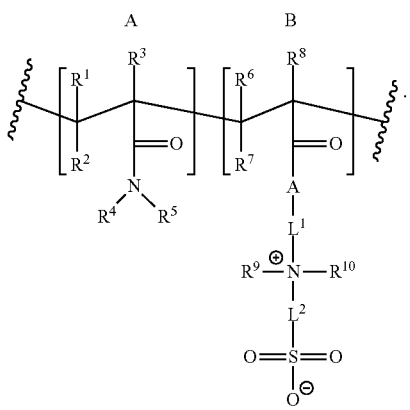

At each occurrence repeating units A and B independently occur in the direction shown or in the opposite direction. Repeating units A and B can have a block or random copolymer arrangement. The variables $R^1$, $R^2$, $R^3$, $R^4$, and $R^5$ can each be independently selected from —H, halo, and substituted or unsubstituted ($C_1$-$C_5$)hydrocarbyl interrupted by 0, 1, 2, or 3 groups independently selected from —O—, —S—, and substituted or unsubstituted —NH—. The variable -A- can be —O— or —NH—. The variables $R^6$, $R^7$, $R^8$, $R^9$, $R^{10}$ can each independently be chosen from —H, halo, and substituted or unsubstituted ($C_1$-$C_5$)hydrocarbyl interrupted by 0, 1, 2, or 3 groups independently selected from —O—, —S—, and substituted or unsubstituted —NH—. The variables $L^1$ and $L^2$ can each independently be chosen from substituted or unsubstituted ($C_1$-$C_5$)hydrocarbylene interrupted by 0, 1, 2, or 3 groups independently selected from —O—, —S—, and substituted or unsubstituted —NH—. The repeating unit A can be about 1 mol % to about 90 mol % of the polymer in the hydrophilic core. The repeating unit B can be about 10 mol % to about 99 mol % of the polymer in the hydrophilic core. The core can include a hydrophilic payload including an acid, a base, a catalyst, a crosslinker, a breaker, or a combination thereof. The core-shell particle can also include a hydrophobic shell covering about 50% to about 100% of the surface area of the hydrophilic core. The hydrophobic shell can include a polymer that includes a) a repeating group that is formed by polymerization of a ($C_2$-$C_{20}$)alkenyl-substituted ($C_6$-$C_{50}$) aryl group, wherein the ($C_6$-$C_{50}$)aryl group is substituted or unsubstituted; b) a repeating group formed by polymerization of a substituted or unsubstituted ($C_1$-$C_{50}$)hydrocarbyl ester of a ($C_1$-$C_{50}$)alkenyl-C(O)OH, wherein the ($C_1$-$C_{50}$) hydrocarbyl is optionally interrupted by 0, 1, 2, or 3 groups independently selected from —O—, —S—, substituted or unsubstituted —NH—, —($CH_2$—$CH_2$—O)$_{n8}$—, and —($CH_2$—$CH_2$—$CH_2$—O)$_{n8}$—, wherein n8 is about 1 to about 10,000; or a combination of a) and b).

In some embodiments, the composition further includes a downhole fluid, or is a downhole fluid. The downhole fluid can be any suitable downhole fluid. In some embodiments, the downhole fluid an acidizing fluid, an enhanced oil recovery fluid, a fracturing fluid, a drilling fluid, a pill, a remedial treatment fluid, logging fluid, or a combination thereof.

Method for Preparing a Core-Shell Particle and Compositions for Treatment of a Subterranean Formation.

In various embodiments, the present invention provides a method of preparing a core-shell particle for treatment of a subterranean formation. In various embodiments, the present invention provides a method of preparing a composition for treatment of a subterranean formation. The method can be any suitable method that produces a core-shell particle or composition described herein. The method can include forming a core-shell particle that includes a hydrophilic core and a hydrophobic shell, such as any embodiment of the core-shell particle described herein. The method can include forming a composition including at least one of the core-shell particles that includes a hydrophilic core and a hydrophobic shell.

Past fabrication techniques for amphiphilic core-shell particles with a hydrophilic core and a hydrophobic shell have failed largely due to two effects: (i) dissolution of the polymer resulting from polymerization of the second monomer and (ii) the critical chain length at which nuclei is formed becomes too long, resulting in spontaneous coagulation. Even if the medium is replaced with an appropriate one, stabilizers or emulsifiers located on the surface of core can lose the efficiency required to keep the dispersion stable. Various embodiments of the present invention overcome these shortcomings and provide a polymerization technique which is flexible and applicable to the make a wide variety of core-shell particles with a hydrophilic core and a hydrophobic shell.

The method can include initiating polymerization of monomers to form the core, such as via any suitable initiation technique. The initiating can include the use of an initiator, such as ammonium persulfate (APS). The polymerization can be performed in the presence of a stabilizer, such as any suitable stabilizer, such as polyvinylpyrrolidone (PVP). The polymerization can be performed in the presence of a crosslinker, such as any suitable crosslinker, such as polyvinyl compound. After the core is formed, the method can include injecting monomers for formation of the hydrophobic shell and polymerizing the same, to form the core-shell particle. The method can also include loading the core with a payload, which can be performed before encapsulation of the core with the shell or after encapsulation with the shell.

EXAMPLES

Various embodiments of the present invention can be better understood by reference to the following Examples which are offered by way of illustration. The present invention is not limited to the Examples given herein.

General.

Acrylamide (AAm), N-(2-methacryloyloxy)ethyl-N,N-dimethyl-ammonio propanesulfonate (Zw), N,N'-methylenebisacrylamide (MBA), ammonium persulfate (APS), and methanol were obtained from Merck Co. (Germany). Poly (vinylpyrrolidone) (PVP, Aldrich) with molecular weight of about 10,000-160,000 g/mol was used as stabilizer, with the 40,000 g/mol PVP working most effectively. All the materials were used without further purification.

Example 1. Synthesis of Core-Shell Particles

Figure 3A:
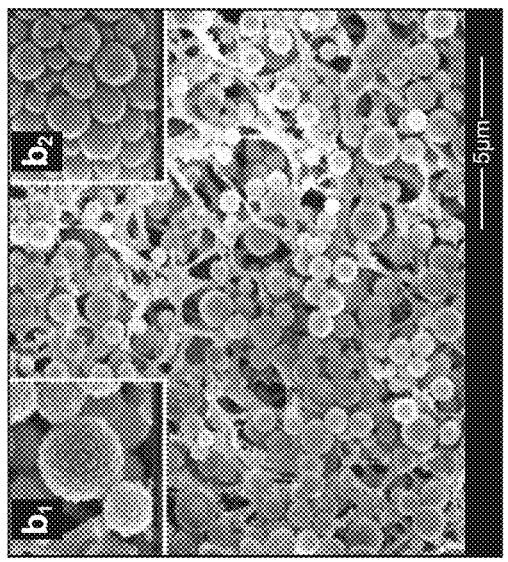
FIG. 3A illustrates a scanning electron microscope (SEM) image of particle cores, in accordance with various embodiments.

Core/shell particles were synthesized by dispersion polymerization in two steps in a one pot reaction. For synthesizing core, zwitterionic monomer (N-(2-methacryloyloxy)ethyl-N,N-dimethyl-ammonio propanesulfonate (Zw)) (1.7 g, 6.1 mmol), acrylamide (AAm) (0.3 g, 4.2 mmol), ammonium persulfate (APS) (15 mg) and poly(vinyl pyrolidone) (PVP) (0.6 g) were added to a 100 mL round bottom flask. Deionized water (9 g) were added to the flask and stirred to have clear solution then ethanol (21 g) were added gradually to flask while the mixture was stirring. The solution was bubbled with nitrogen gas for 30 minutes. The flask was placed in a oil bath with 60 C and the speed of mixing were adjusted on 120 RPM. After 30 minutes, crosslinker solution (N,N'-methylenebisacrylamide (MBA) (1 mol % respect to monomers) in ethanol (6.3 g) and water (2.7 g)) was injected to the flask during 2 hours by syringe pump. The reaction continued for 6 hours and a sample for core particles characterization was taken with one mL syringe under nitrogen blanket. A scanning electron microscope (SEM) image of the particle cores is shown in FIG. 3A. The cores had a diameter of less than 1000 nm.

Figure 3B:
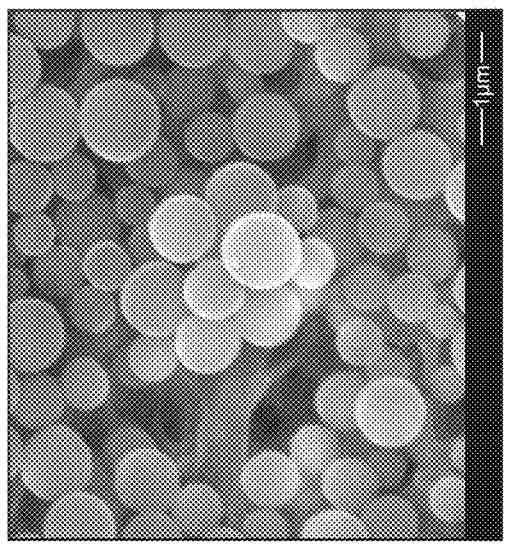
FIG. 3B illustrates a SEM image of core-shell particles, with higher magnification insets $b_1$ and $b_2$, in accordance with various embodiments.

After synthesis of the core particles, de oxygenated solution of styrene (St) (2.0 g) and PVP (0.2 g) in 24.7 grams ethanol, 2 grams water and 15 mg ammonium persulfate was added to the flask and the temperature of reaction was increased to 65 C and the reaction continued for 6 hours. The polystyrene particles heterocoagulated on the surface of core particles and made raspberry core/shell particles. A SEM image of the core-shell particles is shown in FIG. 3B. As can be seen in the higher magnification insets in FIG. 3B, b1 and b2, the initial shape of the particles was raspberry-like.

Figure 3C:
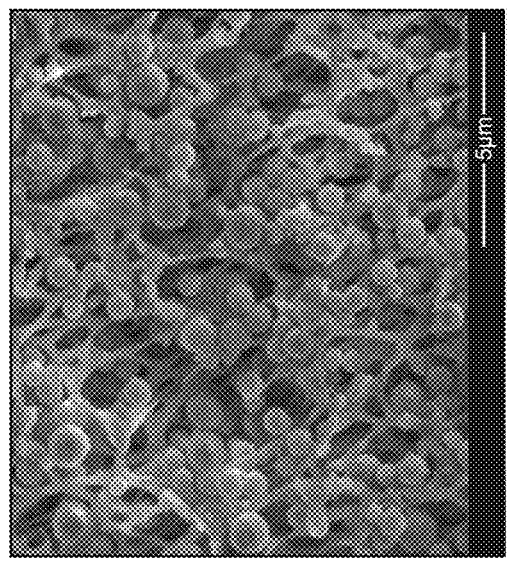
FIG. 3C illustrates a SEM image of core-shell particles, in accordance with various embodiments.

To smooth the shell surface, thermal and chemical treatments were performed. The core/shell raspberry particles were washed three times with mixture of ethanol and water solution (80 wt % ethanol). One gram of toluene was added to the flask that contain core/shell particles solution and the flask was placed in a 95 C oven for one overnight. A SEM image of the smoothed core-shell particles is shown in FIG. 3C. The shell covered 100% of the surface area of the core.

Example 2. Synthesis of Core-Shell Particles

Figure 4A:
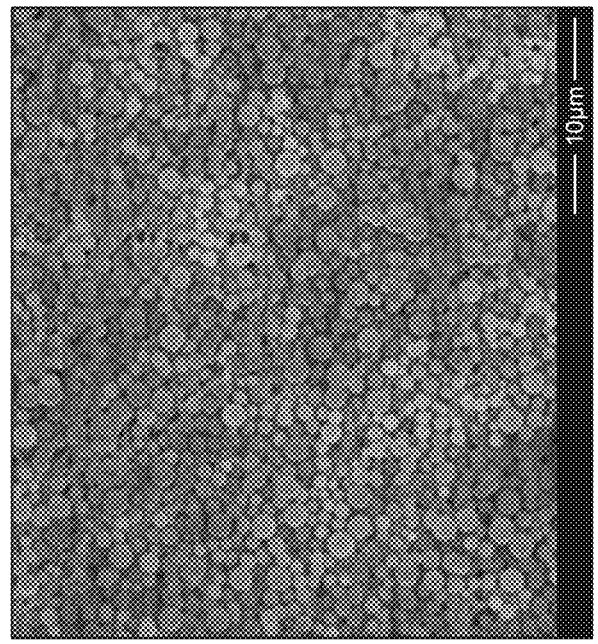
FIG. 4A illustrates a scanning electron microscope (SEM) image of particle cores, in accordance with various embodiments.

The conditions of Example 1 were followed, but using only zwitterionic monomer to make the core. A scanning electron microscope (SEM) image of the particle cores is shown in FIG. 4A. The multidisperse cores had a diameter of 200-1000 nm.

Figure 4B:
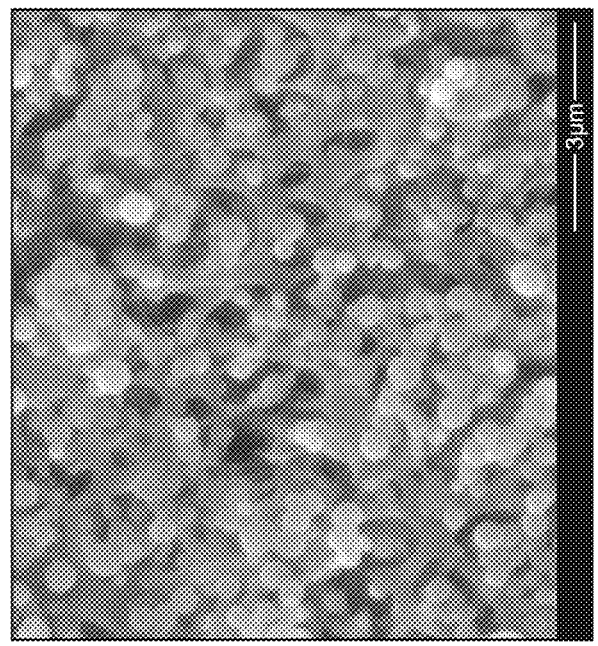
FIG. 4B illustrates a SEM image of core-shell particles, in accordance with various embodiments.

For core/shell particle synthesis, synthesized core particles in this example were used and coated with polystyrene shell particles using the reaction condition as same as mentioned in Example 1. A scanning electron microscope (SEM) image of the core-shell particles is shown in FIG. 4B. The monodisperse cores had a diameter of 300-350 nm.

Example 3. Encapsulation of Acid

The core-shell particles of Example 1 were loaded with acid by soaking them in acidic solution (6 M HCl) at 95° C., a temperature higher than $T_g$ of polymer in shell (90° C.). Over about 1 hour, the cores were swollen by an acidic solution. After cooling and filtration, the shell preserved and enclosed the acid solution, which occupied 95% v/v of the core, and about 90% v/v of the core-shell particles overall.

Example 4. Swelling Behavior of Cores

Figure 5:
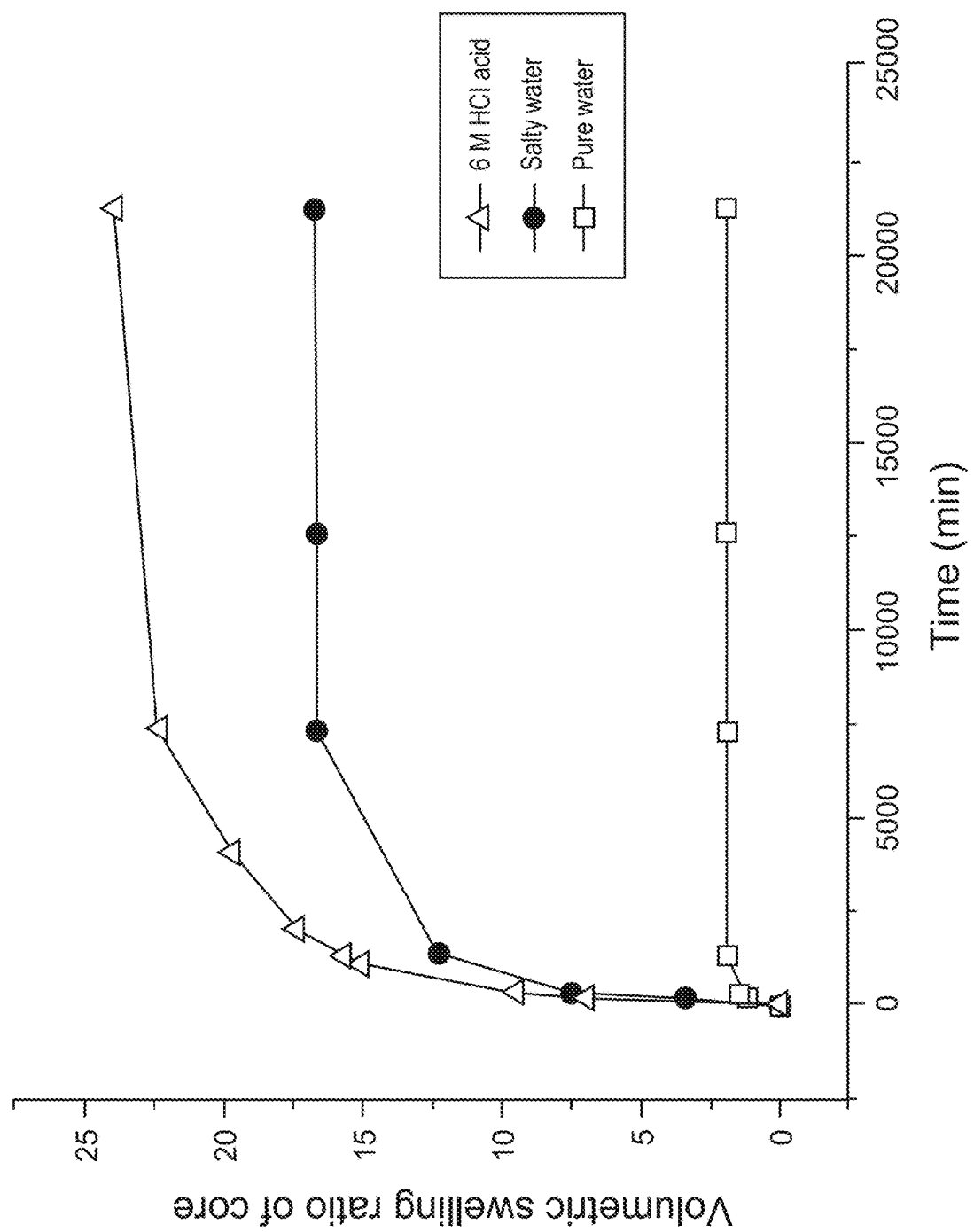
FIG. 5 illustrates the swell ratio of particle cores versus time in various solutions, in accordance with various embodiments.

The cores from Example 2 were placed in deionized water, salt water (8 wt % NaCl, 2 wt % $CaCl_2$), and 6 M HCl, at room temperature, and the swelling behavior of the cores was measured over time using SEM imaging. The results are illustrated in FIG. 5. The cores almost did not swell in pure water at room temperature, but they readily swelled in acidic and salt solutions up to 25 times by volume.

Example 5. Swelling Behavior of Cores Having Varied Composition

Figure 6:
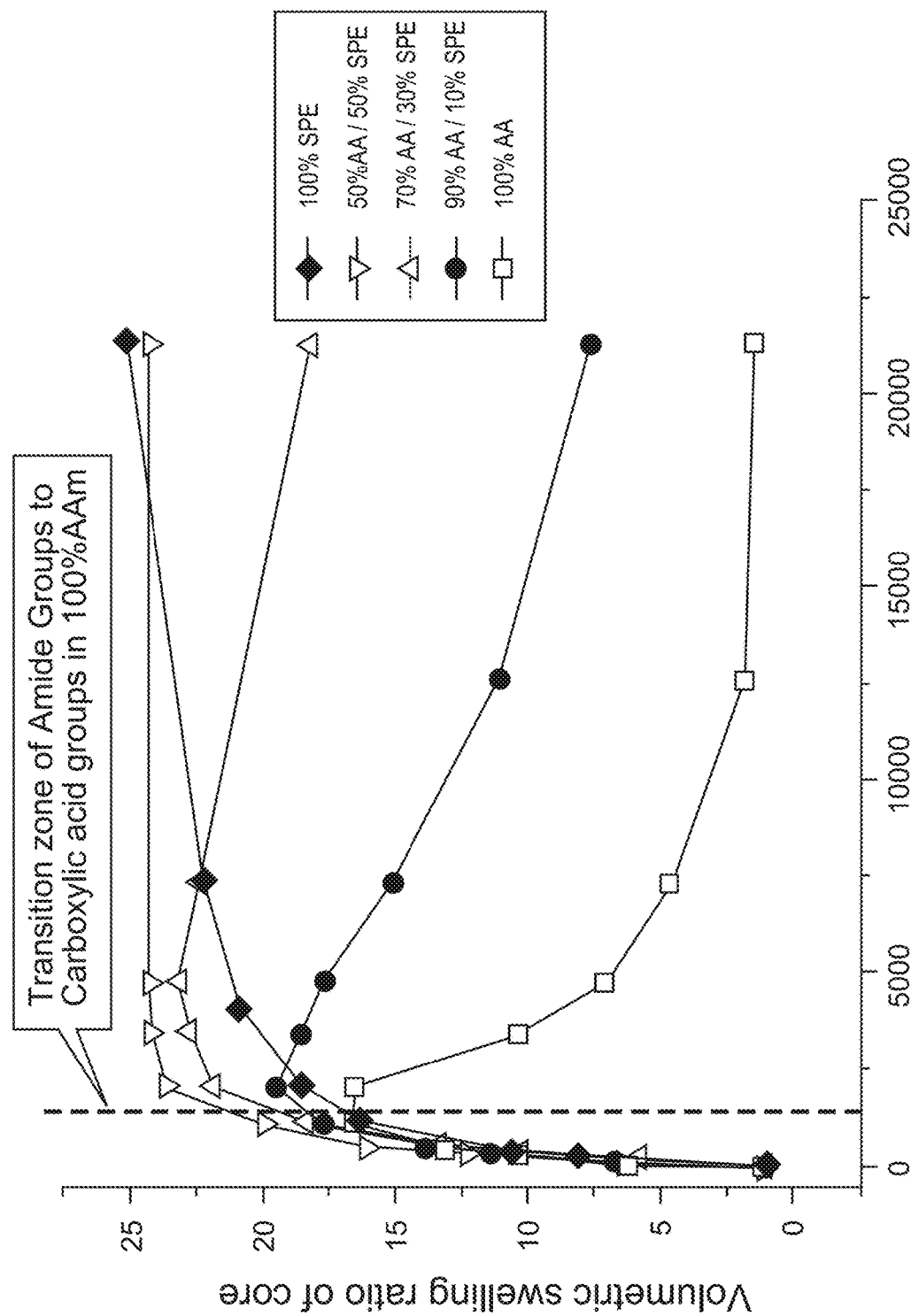
FIG. 6 illustrates the swell ratio of particle cores of varying composition versus time in 6M HCl, in accordance with various embodiments.

The swelling and hydrolysis behavior of various cores made using the procedure of Example 1 was performed. Five different core compositions were tested: 100 mol % N-(2-methacryloyloxy)ethyl-N,N-dimethyl-ammonio propanesulfonate (SPE), 50 mol % acrylamide (AA) and 50 mol % SPE, 70 mol % AA and 30 mol % SPE, 90 mol % AA and 10 mol % SPE, and 100% AA. The cores were placed in 6 M HCl solution. The swelling behavior is illustrated in FIG. 6.

Example 6. Effect of Shell on Acid-Release Behavior

Figure 7:
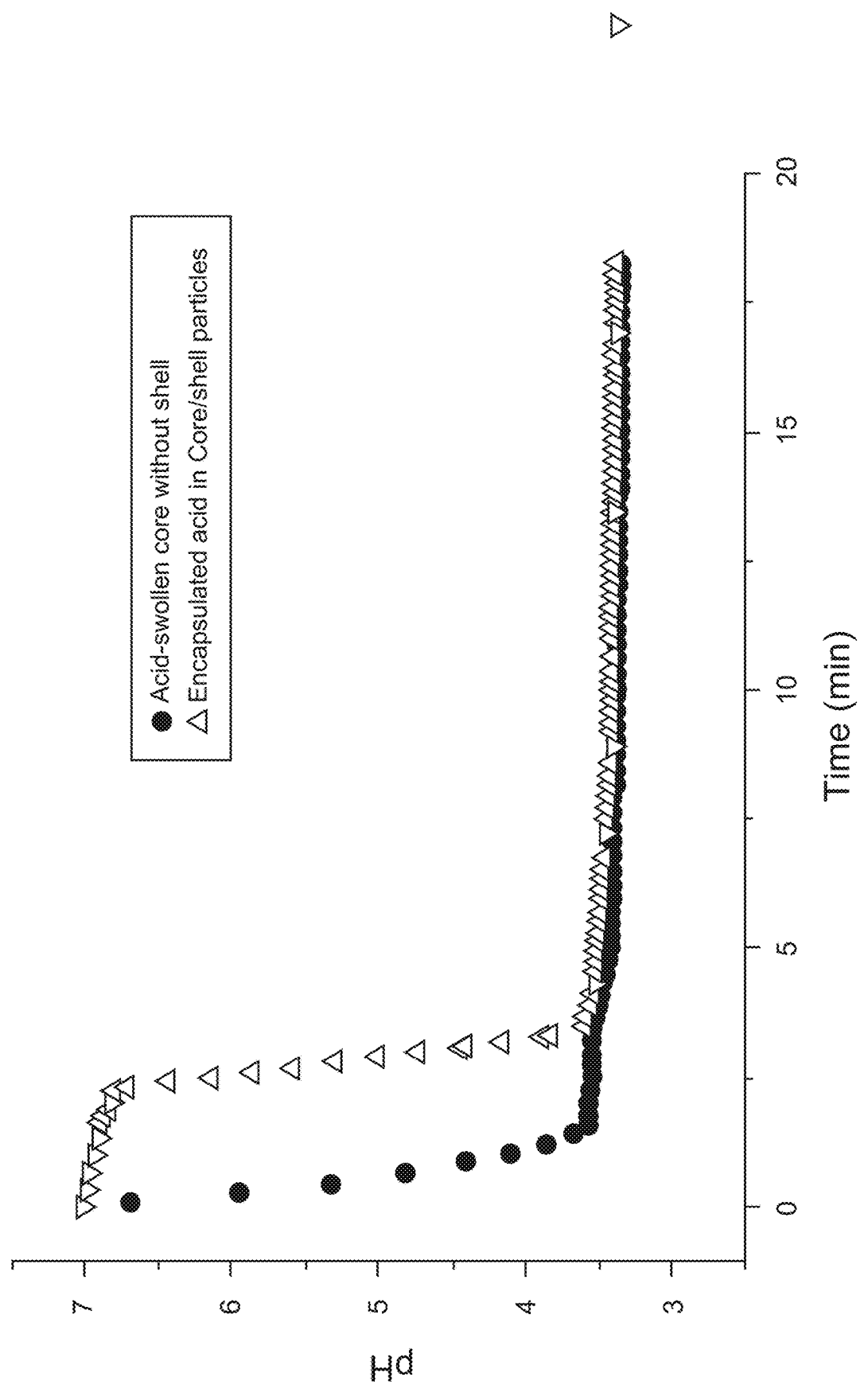
FIG. 7 illustrates pH versus time for an acid-swollen core with no shell and an acid-swollen core with a shell and with crushing at 2.5 minutes, in accordance with various embodiments.

The acid swollen cores from Example 4 (fully swollen with 6M HCl) were placed in water and the pH over time was measured. The acid-loaded core-shell particles from Example 3 (with 95% v/v 6M HCl) were placed in water and the pH was measured over time, with crushing of the core-shell particles performed at 2.5 minutes. The results are illustrated in FIG. 7.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in the subterranean formation a composition comprising
a core-shell particle comprising
a hydrophilic core; and
a hydrophobic shell.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the composition is an acidizing fluid, an enhanced oil recovery fluid, a fracturing fluid, a drilling fluid, a pill, a remedial treatment fluid, logging fluid, or a combination thereof.

Embodiment 5 provides the method of any one of Embodiments 1-4, wherein the method comprises acidizing, performing enhanced oil recovery, fracturing, drilling, fluid loss control, logging, or a combination thereof.

Embodiment 6 provides the method of any one of Embodiments 1-5, wherein the core-shell particle has a particle size of about 100 nm to about 1 mm.

Embodiment 7 provides the method of any one of Embodiments 1-6, wherein the core-shell particle has a particle size of about 250 nm to about 10 microns Embodiment 8 provides the method of any one of Embodiments 1-7, wherein the core-shell particle is approximately spherical.

Embodiment 9 provides the method of any one of Embodiments 1-8, wherein the shell has a thickness of about 1 nm to about 10 microns.

Embodiment 10 provides the method of any one of Embodiments 1-9, wherein the shell has a thickness of about 10 nm to about 1 micron.

Embodiment 11 provides the method of any one of Embodiments 1-10, wherein the shell covers about 50% to about 100% of the surface area of the hydrophilic core.

Embodiment 12 provides the method of any one of Embodiments 1-11, wherein the shell covers about 90% to about 100% of the surface area of the hydrophilic core.

Embodiment 13 provides the method of any one of Embodiments 1-12, wherein the shell has a substantially smooth surface.

Embodiment 14 provides the method of any one of Embodiments 1-13, wherein the shell has a rough or dimpled surface.

Embodiment 15 provides the method of any one of Embodiments 1-14, further comprising at least partially releasing the shell from the core.

Embodiment 16 provides the method of any one of Embodiments 1-15, wherein the core comprises a payload.

Embodiment 17 provides the method of Embodiment 16, wherein the payload is a hydrophilic payload.

Embodiment 18 provides the method of any one of Embodiments 16-17, wherein the payload comprises an acid, a base, a catalyst, a crosslinker, a breaker, a hydrophilic polymer, or a combination thereof.

Embodiment 19 provides the method of any one of Embodiments 16-18, wherein the payload comprises an acid.

Embodiment 20 provides the method of any one of Embodiments 16-19, wherein the payload comprises an acid that is hydrochloric acid, sulfuric acid, nitric acid, hydrofluoric acid, acetic acid, formic acid, or a combination thereof.

Embodiment 21 provides the method of any one of Embodiments 16-20, wherein the payload comprises an acid that is hydrochloric acid.

Embodiment 22 provides the method of any one of Embodiments 19-21, wherein the composition is an acidizing fluid, an enhanced oil recovery fluid, a remedial treatment fluid, or a combination thereof.

Embodiment 23 provides the method of any one of Embodiments 16-22, wherein the payload comprises a crosslinker, a breaker, a hydrophilic polymer, or a combination thereof, wherein the composition is a fracturing fluid.

Embodiment 24 provides the method of any one of Embodiments 16-23, wherein the payload is about 0.01 wt % to about 99 wt % of the core.

Embodiment 25 provides the method of any one of Embodiments 16-24, wherein the payload is about 5 wt % to about 95 wt % of the core.

Embodiment 26 provides the method of any one of Embodiments 16-25, further comprising releasing the payload from the core-shell particle.

Embodiment 27 provides the method of Embodiment 26, wherein releasing the payload from the core-shell particle comprises releasing or removing the core from at least part of the shell.

Embodiment 28 provides the method of any one of Embodiments 26-27, wherein releasing the payload from the core-shell particle comprises crushing the core-shell particle, breaking or dislodging at least part of the shell from the core, dissolving at least part of the shell, and swelling the core and releasing at least part of the core from the shell.

Embodiment 29 provides the method of any one of Embodiments 26-28, wherein releasing the payload from the core-shell particle comprises exposing the core-shell particle to compression, crushing, grinding, shear, dissolving solvent, internal pressure from a swelling core, high temperature, external pressure, or non-neutral pH.

Embodiment 30 provides the method of any one of Embodiments 1-29, wherein the hydrophilic core comprises a hydrophilic polymer.

Embodiment 31 provides the method of Embodiment 30, wherein the hydrophilic polymer and any payload present is about 0.001 wt % to about 100 wt % of the hydrophilic core.

Embodiment 32 provides the method of any one of Embodiments 30-31, wherein the hydrophilic polymer and any payload present is about 100 wt % of the hydrophilic core.

Embodiment 33 provides the method of any one of Embodiments 1-32, wherein the hydrophilic core comprises a crosslinked hydrophilic polymer.

Embodiment 34 provides the method of any one of Embodiments 1-33, wherein the hydrophilic core comprises a hydrogel.

Embodiment 35 provides the method of any one of Embodiments 1-34, wherein the hydrophilic core is about 1 wt % to about 99.999 wt % of the core-shell particle.

Embodiment 36 provides the method of any one of Embodiments 1-35, wherein the hydrophilic core comprises a polymer comprising a repeating unit having the structure:

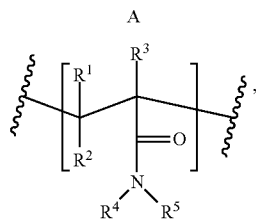

wherein $R^1$, $R^2$, $R^3$, $R^4$, and $R^5$ are each independently selected from —H, halo, and substituted or unsubstituted ($C_1$-$C_5$)hydrocarbyl interrupted by 0, 1, 2, or 3 groups independently selected from —O—, —S—, and substituted or unsubstituted —NH—.

Embodiment 37 provides the method of Embodiment 36, wherein $R^1$, $R^2$, $R^3$, $R^4$, and $R^5$ are each independently selected from —H and substituted or unsubstituted ($C_1$-$C_5$) hydrocarbyl.

Embodiment 38 provides the method of any one of Embodiments 36-37, wherein $R^1$, $R^2$, $R^3$, $R^4$, and $R^5$ are each independently selected from —H and ($C_1$-$C_5$)alkyl.

Embodiment 39 provides the method of any one of Embodiments 36-38, wherein $R^1$, $R^2$, $R^4$, and $R^5$ are —H, and wherein $R^3$ is —H or methyl.

Embodiment 40 provides the method of any one of Embodiments 36-39, wherein $R^1$, $R^2$, $R^3$, $R^4$, and $R^5$ are each —H.

Embodiment 41 provides the method of any one of Embodiments 36-40, wherein repeating unit A is about 0 mol % to about 99 mol % of the hydrophilic core polymer.

Embodiment 42 provides the method of any one of Embodiments 36-41, wherein repeating unit A is about 1 mol % to about 90 mol % of the hydrophilic core polymer.

Embodiment 43 provides the method of any one of Embodiments 36-42, wherein the hydrophilic core comprises a polymer comprising a repeating unit having the structure:

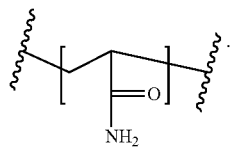

Embodiment 44 provides the method of any one of Embodiments 1-43, wherein the hydrophilic core comprises a polymer comprising at least one repeating unit that has a zwitterionic structure.

Embodiment 45 provides the method of Embodiment 44, wherein the repeating unit having a zwitterionic structure is about 1 mol % to about 100 mol % of the polymer in the hydrophilic core.

Embodiment 46 provides the method of any one of Embodiments 44-45, wherein the repeating unit having a zwitterionic structure is about 10 mol % to about 99 mol % of the polymer in the hydrophilic core.

Embodiment 47 provides the method of any one of Embodiments 1-46, wherein the hydrophilic core comprises a polymer comprising a repeating unit having the structure:

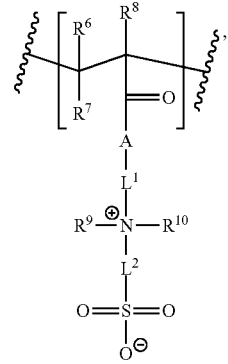

wherein
-A- is —O— or —NH—,
$R^6$, $R^7$, $R^8$, $R^9$, $R^{10}$ are each independently chosen from —H, halo, and substituted or unsubstituted ($C_1$-$C_5$) hydrocarbyl interrupted by 0, 1, 2, or 3 groups independently selected from —O—, —S—, and substituted or unsubstituted —NH—, and
$L^1$ and $L^2$ are each independently chosen from substituted or unsubstituted ($C_1$-$C_5$)hydrocarbylene interrupted by 0, 1, 2, or 3 groups independently selected from —O—, —S—, and substituted or unsubstituted —NH—.

Embodiment 48 provides the method of Embodiment 47, wherein $R^6$, $R^7$, $R^8$, $R^9$, $R^{10}$ are each independently chosen from —H and ($C_1$-$C_5$)hydrocarbyl.

Embodiment 49 provides the method of any one of Embodiments 47-48, wherein $R^6$, $R^7$, $R^8$, $R^9$, $R^{10}$ are each independently chosen from —H and ($C_1$-$C_8$)alkyl.

Embodiment 50 provides the method of any one of Embodiments 47-49, wherein $R^6$, $R^7$ are —H, and $R^8$, $R^9$, $R^{10}$ are methyl.

Embodiment 51 provides the method of any one of Embodiments 47-50, wherein $L^1$ and $L^2$ are each independently chosen from ($C_1$-$C_8$)hydrocarbylene.

Embodiment 52 provides the method of any one of Embodiments 47-51, wherein $L^1$ and $L^2$ are each independently ($C_1$-$C_5$)alkylene.

Embodiment 53 provides the method of any one of Embodiments 47-52, wherein $L^1$ and $L^2$ are each independently selected from ethylene and propylene.

Embodiment 54 provides the method of any one of Embodiments 1-53, wherein the hydrophilic core comprises a polymer comprising a repeating unit that has the structure:

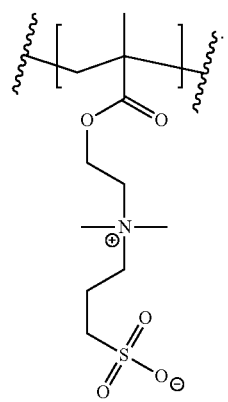

Embodiment 55 provides the method of any one of Embodiments 1-54, wherein the hydrophilic core comprises a polymer comprising a repeating unit that is formed from N-(2-methacryloyloxy)ethyl-N,N-dimethyl-ammonio propanesulfonate (SPE), having the structure:

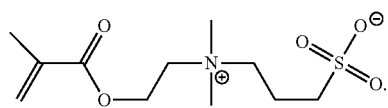

Embodiment 56 provides the method of any one of Embodiments 1-55, wherein the hydrophilic core comprises a polymer comprising a repeating unit that has the structure:

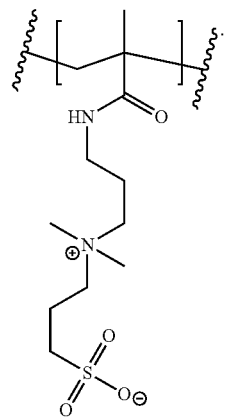

Embodiment 57 provides the method of any one of Embodiments 1-56, wherein the hydrophilic core comprises a polymer comprising a repeating unit that is formed from N-(3-methacryloylamino)propyl-N,N-dimethyl-ammonio propanesulfonate (SPP), having the structure:

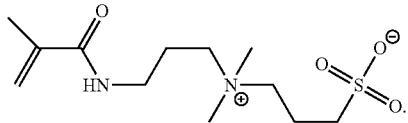

Embodiment 58 provides the method of any one of Embodiments 1-57, wherein the hydrophilic core comprises a polymer comprising a repeating unit having the structure:

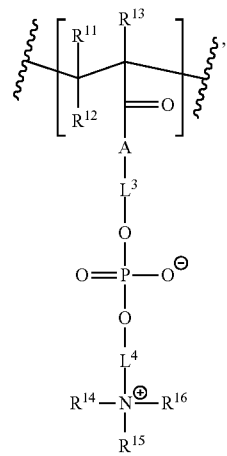

wherein
-A- is —O— or —NH—,
$R^{11}$, $R^{12}$, $R^{13}$, $R^{14}$, $R^{15}$, $R^{16}$ are each independently chosen from —H, halo, and substituted or unsubstituted $(C_1-C_5)$hydrocarbyl interrupted by 0, 1, 2, or 3 groups independently selected from —O—, —S—, and substituted or unsubstituted —NH—, and
$L^3$ and $L^4$ are each independently chosen from substituted or unsubstituted $(C_1-C_5)$hydrocarbylene interrupted by 0, 1, 2, or 3 groups independently selected from —O—, —S—, and substituted or unsubstituted —NH—.

Embodiment 59 provides the method of Embodiment 58, wherein $R^{11}$, $R^{12}$, $R^{13}$, $R^{14}$, $R^{15}$, $R^{16}$ are each independently chosen from —H and $(C_1-C_5)$hydrocarbyl.

Embodiment 60 provides the method of any one of Embodiments 58-59, wherein $R^{11}$, $R^{12}$, $R^{13}$, $R^{14}$, $R^{15}$, $R^{16}$ are each independently chosen from —H and $(C_1-C_5)$alkyl.

Embodiment 61 provides the method of any one of Embodiments 58-60, wherein $R^{11}$ and $R^{12}$ are —H, and $R^{13}$, $R^{14}$, $R^{15}$, $R^{16}$ are methyl.

Embodiment 62 provides the method of any one of Embodiments 58-61, wherein $L^3$ and $L^4$ are $(C_1-C_5)$hydrocarbylene.

Embodiment 63 provides the method of any one of Embodiments 58-62, wherein $L^3$ and $L^4$ are $(C_1-C_5)$alkylene.

Embodiment 64 provides the method of any one of Embodiments 58-63, wherein $L^3$ and $L^4$ are ethylene.

Embodiment 65 provides the method of any one of Embodiments 1-64, wherein the hydrophilic core comprises a polymer comprising a repeating unit that has the structure:

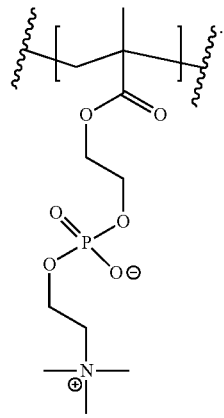

Embodiment 66 provides the method of any one of Embodiments 1-65, wherein the hydrophilic core comprises a polymer comprising a repeating unit that is formed from 2-(methacryloyloxy)ethylphosphatidylcholine (MPC), having the structure:

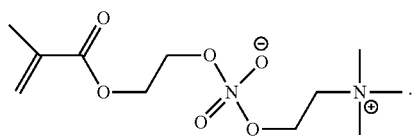

Embodiment 67 provides the method of any one of Embodiments 1-66, wherein the hydrophilic core comprises a polymer comprising a repeating unit having the structure:

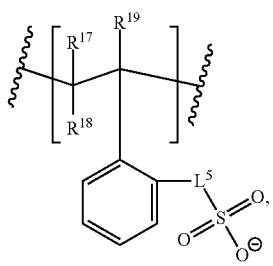

wherein
$R^{17}$, $R^{18}$, and $R^{19}$ are each independently chosen from —H, halo, and substituted or unsubstituted $(C_1-C_5)$ hydrocarbyl interrupted by 0, 1, 2, or 3 groups independently selected from —O—, —S—, and substituted or unsubstituted —NH—, and
$L^5$ is independently substituted or unsubstituted $(C_1-C_5)$ hydrocarbylene interrupted by 0, 1, 2, or 3 groups independently selected from —O—, —S—, and substituted or unsubstituted —NH—.

Embodiment 68 provides the method of Embodiment 67, wherein $R^{17}$, $R^{18}$, and $R^{19}$ are each independently chosen from H and $(C_1-C_8)$hydrocarbyl.

Embodiment 69 provides the method of any one of Embodiments 67-68, wherein $R^{17}$, $R^{18}$, and $R^{19}$ are each independently chosen from —H and $(C_1-C_5)$alkyl.

Embodiment 70 provides the method of any one of Embodiments 67-69, wherein $R^{17}$, $R^{18}$, and $R^{19}$ are each —H.

Embodiment 71 provides the method of any one of Embodiments 67-70, wherein $L^5$ is $(C_1-C_8)$hydrocarbyl.

Embodiment 72 provides the method of any one of Embodiments 67-71, wherein $L^5$ is $(C_1-C_5)$alkylene.

Embodiment 73 provides the method of any one of Embodiments 67-72, wherein $L^5$ is propylene.

Embodiment 74 provides the method of any one of Embodiments 1-73, wherein the hydrophilic core comprises a polymer comprising a repeating unit that has the structure:

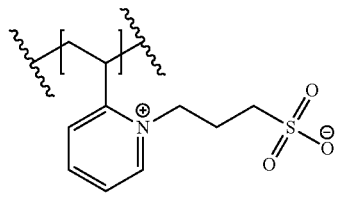

Embodiment 75 provides the method of any one of Embodiments 1-74, wherein the hydrophilic core comprises a polymer comprising a repeating unit that is formed from 3-(2'-vinyl-pyridinio)propanesulfonate (SPV), having the structure:

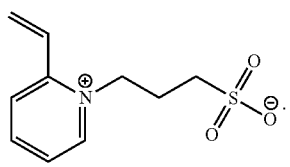

Embodiment 76 provides the method of any one of Embodiments 1-75, wherein the hydrophilic core comprises a polymer comprising a repeating unit having the structure:

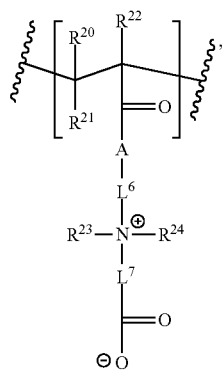

wherein

-A- is —O— or —NH—, $R^{20}$, $R^{21}$, $R^{22}$, $R^{23}$, $R^{24}$, $R^{25}$ are each independently chosen from —H, halo, and substituted or unsubstituted $(C_1-C_5)$hydrocarbyl interrupted by 0, 1, 2, or 3 groups independently selected from —O—, —S—, and substituted or unsubstituted —NH—, and $L^6$ and $L^7$ are each independently chosen from substituted or unsubstituted $(C_1-C_5)$hydrocarbylene interrupted by 0, 1, 2, or 3 groups independently selected from —O—, —S—, and substituted or unsubstituted —NH—.

Embodiment 77 provides the method of Embodiment 76, wherein $R^{20}$, $R^{21}$, $R^{22}$, $R^{23}$, $R^{24}$, $R^{25}$ are each independently chosen from —H and $(C_1-C_5)$hydrocarbyl.

Embodiment 78 provides the method of any one of Embodiments 76-77, wherein $R^{20}$, $R^{21}$, $R^{22}$, $R^{23}$, $R^{24}$, $R^{25}$ are each independently chosen from —H and $(C_1-C_5)$alkyl.

Embodiment 79 provides the method of any one of Embodiments 76-78, wherein $R^{20}$ and $R^{21}$ are —H, and $R^{22}$, $R^{23}$, $R^{24}$, and $R^{25}$ are methyl.

Embodiment 80 provides the method of any one of Embodiments 76-79, wherein $L^6$ and $L^7$ are $(C_1-C_8)$hydrocarbylene.

Embodiment 81 provides the method of any one of Embodiments 76-80, wherein $L^6$ and $L^7$ are $(C_1-C_5)$alkylene.

Embodiment 82 provides the method of any one of Embodiments 76-81, wherein $L^6$ and $L^7$ are independently selected from ethylene and propylene.

Embodiment 83 provides the method of any one of Embodiments 1-82, wherein the hydrophilic core comprises a polymer comprising repeating units having the structure:

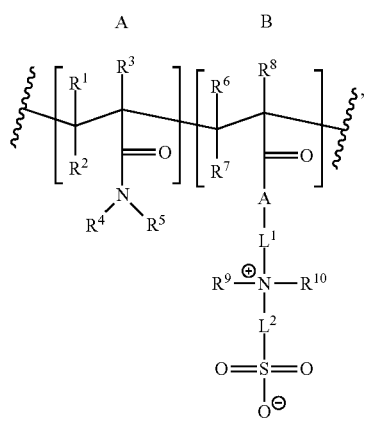

wherein at each occurrence repeating units A and B independently occur in the direction shown or in the opposite direction, repeating units A and B have a block or random copolymer arrangement, $R^1$, $R^2$, $R^3$, $R^4$, and $R^5$ are each independently selected from —H, halo, and substituted or unsubstituted $(C_1-C_5)$hydrocarbyl interrupted by 0, 1, 2, or 3 groups independently selected from —O—, —S—, and substituted or unsubstituted —NH—, -A- is —O— or —NH—, $R^6$, $R^7$, $R^8$, $R^9$, $R^{10}$ are each independently chosen from —H, halo, and substituted or unsubstituted $(C_1-C_5)$ hydrocarbyl interrupted by 0, 1, 2, or 3 groups independently selected from —O—, —S—, and substituted or unsubstituted —NH—, $L^1$ and $L^2$ are each independently chosen from substituted or unsubstituted $(C_1-C_5)$hydrocarbylene interrupted by 0, 1, 2, or 3 groups independently selected from —O—, —S—, and substituted or unsubstituted —NH—, repeating unit A is about 1 mol % to about 90 mol % of the polymer in the hydrophilic core, and repeating unit B is about 10 mol % to about 99 mol % of the polymer in the hydrophilic core.

Embodiment 84 provides the method of any one of Embodiments 1-83, wherein the hydrophilic core comprises a polymer crosslinked via a polyvinyl monomer chosen from a $(C_1-C_{20})$alkylenebiacrylamide, a poly$((C_1-C_{20})$alkenyl)-substituted mono- or poly-$(C_1-C_{20})$alkyl ether, a poly$(C_2$-

C$_{20}$)alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, and combinations thereof.

Embodiment 85 provides the method of any one of Embodiments 1-84, wherein the hydrophobic core comprises a polymer comprising a stabilizer.

Embodiment 86 provides the method of Embodiment 85, wherein the stabilizer is polyvinylpyrrolidone (PVP).

Embodiment 87 provides the method of any one of Embodiments 1-86, wherein the hydrophobic shell is about 0.001 wt % to about 99 wt % of the core-shell particle.

Embodiment 88 provides the method of any one of Embodiments 1-87, wherein the hydrophobic shell comprises a polymer comprising at least one repeating group that is hydrophobic.

Embodiment 89 provides the method of Embodiment 88, wherein the polymer comprising the at least one repeating group that is hydrophobic is about 50 wt % to about 100 wt % of the hydrophobic shell.

Embodiment 90 provides the method of any one of Embodiments 88-89, wherein the polymer comprising the at least one repeating group that is hydrophobic is about 100 wt % of the hydrophobic shell.

Embodiment 91 provides the method of any one of Embodiments 88-90, wherein the at least one repeating group that is hydrophobic is about 10 mol % to about 100 mol % of the polymer in the hydrophobic shell.

Embodiment 92 provides the method of any one of Embodiments 88-91, wherein the at least one repeating group that is hydrophobic is about 100 mol % of the polymer in the hydrophobic shell.

Embodiment 93 provides the method of any one of Embodiments 1-92, wherein the hydrophobic shell comprises a polymer comprising a repeating group that is formed by polymerization of a (C$_2$-C$_{20}$)alkenyl-substituted (C$_6$-C$_{50}$) aryl group, wherein the (C$_6$-C$_{50}$)aryl group is further substituted or unsubstituted.

Embodiment 94 provides the method of any one of Embodiments 1-93, wherein the hydrophobic shell comprises a polymer comprising a repeating group that is formed by polymerization of a vinyl-substituted phenyl group, wherein the phenyl group is substituted or unsubstituted.

Embodiment 95 provides the method of any one of Embodiments 1-94, wherein the hydrophobic shell comprises a polymer comprising a repeating group formed by polymerization of styrene.

Embodiment 96 provides the method of any one of Embodiments 1-95, wherein the hydrophobic shell comprises a polymer comprising a repeating group formed by polymerization of a substituted or unsubstituted (C$_1$-C$_{50}$) hydrocarbyl ester of a (C$_1$-C$_{50}$)alkenyl-C(O)OH, wherein the (C$_1$-C$_{50}$)hydrocarbyl is optionally interrupted by 0, 1, 2, or 3 groups independently selected from —O—, —S—, substituted or unsubstituted —NH—, —(CH$_2$—CH$_2$—O)$_{n8}$—, and —(CH$_2$—CH$_2$—CH$_2$—O)$_{n8}$—, wherein n8 is about 1 to about 10,000.

Embodiment 97 provides the method of any one of Embodiments 1-96, wherein the hydrophobic shell comprises a polymer comprising a repeating group formed by polymerization of a substituted or unsubstituted (C$_1$-C$_{10}$) alkyl ester of a substituted or unsubstituted acrylic acid.

Embodiment 98 provides the method of any one of Embodiments 1-97, wherein the hydrophobic shell comprises a polymer comprising a repeating group formed by polymerization of methyl methacrylate.

Embodiment 99 provides the method of any one of Embodiments 1-98, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation comprises placing the mixture in the subterranean formation.

Embodiment 100 provides the method of any one of Embodiments 1-99, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 101 provides the method of any one of Embodiments 1-100, wherein the placing of the composition in the subterranean formation comprises pumping the composition through a tubular disposed in a wellbore and into the subterranean formation.

Embodiment 102 provides the method of any one of Embodiments 1-101, wherein the placing of the composition in the subterranean formation comprises pumping the composition through a drill string disposed in a wellbore, through a drill bit at a downhole end of the drill string, and back above-surface through an annulus.

Embodiment 103 provides the method of Embodiment 102, further comprising processing the composition exiting the annulus with at least one fluid processing unit to generate a cleaned composition and recirculating the cleaned composition through the wellbore.

Embodiment 104 provides a system for performing the method of any one of Embodiments 1-103, the system comprising:
a tubular disposed in the subterranean formation; and
a pump configured to pump the composition in the subterranean formation through the tubular.

Embodiment 105 provides a system for performing the method of any one of Embodiments 1-104, the system comprising:
a drill string disposed in a wellbore, the drill string comprising a drill bit at a downhole end of the drill string;
an annulus between the drill string and the wellbore; and
a pump configured to circulate the composition through the drill string, through the drill bit, and back above-surface through the annulus.

Embodiment 106 provides a method of treating a subterranean formation, the method comprising:
placing in the subterranean formation a composition comprising a core-shell particle comprising
a hydrophilic core comprising
a polymer comprising repeating units having the structure:

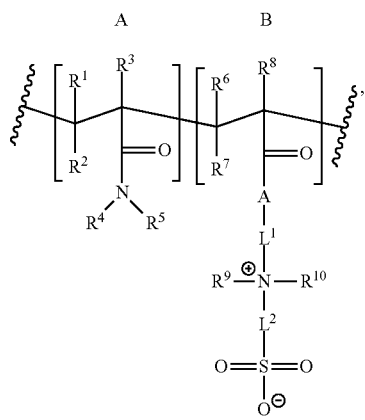

wherein
at each occurrence repeating units A and B independently occur in the direction shown or in the opposite direction,
repeating units A and B have a block or random copolymer arrangement,
$R^1$, $R^2$, $R^3$, $R^4$, and $R^5$ are each independently selected from —H, halo, and substituted or unsubstituted ($C_1$-$C_5$)hydrocarbyl interrupted by 0, 1, 2, or 3 groups independently selected from —O—, —S—, and substituted or unsubstituted —NH—,
-A- is —O— or —NH—,
$R^6$, $R^7$, $R^8$, $R^9$, $R^{10}$ are each independently chosen from —H, halo, and substituted or unsubstituted ($C_1$-$C_8$)hydrocarbyl interrupted by 0, 1, 2, or 3 groups independently selected from —O—, —S—, and substituted or unsubstituted —NH—,
$L^1$ and $L^2$ are each independently chosen from substituted or unsubstituted ($C_1$-$C_8$)hydrocarbylene interrupted by 0, 1, 2, or 3 groups independently selected from —O—, —S—, and substituted or unsubstituted —NH—,
repeating unit A is about 1 mol % to about 90 mol % of the polymer in the hydrophilic core, and
repeating unit B is about 10 mol % to about 99 mol % of the polymer in the hydrophilic core, and a hydrophilic payload comprising an acid, a base, a catalyst, a crosslinker, a breaker, a hydrophilic polymer, or a combination thereof; and
a hydrophobic shell covering about 50% to about 100% of the surface area of the hydrophilic core, the hydrophobic shell comprising a polymer that comprises
a repeating group that is formed by polymerization of a ($C_2$-$C_{20}$)alkenyl-substituted ($C_6$-$C_{50}$)aryl group, wherein the ($C_6$-$C_{50}$)aryl group is further substituted or unsubstituted,
a repeating group formed by polymerization of a substituted or unsubstituted ($C_1$-$C_{50}$)hydrocarbyl ester of a ($C_1$-$C_{50}$)alkenyl-C(O)OH, wherein the ($C_1$-$C_{50}$) hydrocarbyl is optionally interrupted by 0, 1, 2, or 3 groups independently selected from —O—, —S—, substituted or unsubstituted —NH—, —(CH$_2$—CH$_2$—O)$_{n8}$—, and —(CH$_2$—CH$_2$—CH$_2$—O)$_{n8}$—, wherein n8 is about 1 to about 10,000, or
a combination thereof; and
releasing the payload from the core-shell particle in the subterranean formation, comprising releasing or removing the core from at least part of the shell.

Embodiment 107 provides a system comprising:
a tubular disposed in a subterranean formation; and
a pump configured to pump a composition comprising a core-shell particle in the subterranean formation through the tubular, wherein the core-shell particle comprises
a hydrophilic core; and
a hydrophobic shell.

Embodiment 108 provides a core-shell particle for treatment of a subterranean formation, the core-shell particle comprising:
a hydrophilic core; and
a hydrophobic shell.

Embodiment 109 provides a core-shell particle for treatment of a subterranean formation, the core-shell particle comprising:
a hydrophilic core comprising
a polymer comprising repeating units having the structure:

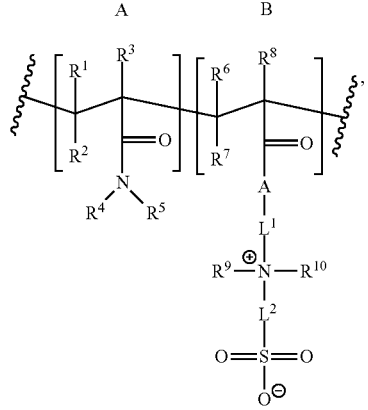

wherein
at each occurrence repeating units A and B independently occur in the direction shown or in the opposite direction,
repeating units A and B have a block or random copolymer arrangement,
$R^1$, $R^2$, $R^3$, $R^4$, and $R^5$ are each independently selected from —H, halo, and substituted or unsubstituted ($C_1$-$C_5$)hydrocarbyl interrupted by 0, 1, 2, or 3 groups independently selected from —O—, —S—, and substituted or unsubstituted —NH—, -A- is —O— or —NH—, $R^6$, $R^7$, $R^8$, $R^9$, $R^{10}$ are each independently chosen from —H, halo, and substituted or unsubstituted ($C_1$-$C_5$) hydrocarbyl interrupted by 0, 1, 2, or 3 groups independently selected from —O—, —S—, and substituted or unsubstituted —NH—, $L^1$ and $L^2$ are each independently chosen from substituted or unsubstituted ($C_1$-$C_8$)hydrocarbylene interrupted by 0, 1, 2, or 3 groups independently selected from —O—, —S—, and substituted or unsubstituted —NH—, repeating unit A is about 1 mol % to about 90 mol % of the polymer in the hydrophilic core, and repeating unit B is about 10 mol % to about 99 mol % of the polymer in the hydrophilic core, and a hydrophilic payload comprising an acid, a base, a catalyst, a crosslinker, a breaker, a hydrophilic polymer, or a combination thereof; and a hydrophobic shell covering about 50% to about 100% of the surface area of the hydrophilic core, the hydrophobic shell comprising a polymer that comprises a repeating group that is formed by polymerization of a ($C_2$-$C_{20}$)alkenyl-substituted ($C_6$-$C_{50}$)aryl group, wherein the ($C_6$-$C_{50}$)aryl group is substituted or unsubstituted a repeating group formed by polymerization of a substituted or unsubstituted ($C_1$-$C_{50}$)hydrocarbyl ester of a ($C_1$-$C_{50}$)alkenyl-C(O)OH, wherein the ($C_1$-$C_{50}$)hydrocarbyl is optionally interrupted by 0, 1, 2, or 3 groups independently selected from —O—, —S—, substituted or unsubstituted —NH—, —(CH$_2$—CH$_2$—O)$_{n8}$—, and —(CH$_2$—CH$_2$—CH$_2$—O)$_{n8}$—, wherein n8 is about 1 to about 10,000, or a combination thereof.

Embodiment 110 provides a method of preparing a composition for treatment of a subterranean formation, the method comprising:

forming a composition comprising a core-shell particle comprising a hydrophilic core; and a hydrophobic shell.

Embodiment 111 provides the method, system, core-shell particle, or composition of any one or any combination of Embodiments 1-110 optionally configured such that all elements or options recited are available to use or select from.

What is claimed is:

1. A method of treating a subterranean formation, the method comprising:

adjusting a composition of a hydrophilic core of a core-shell particle to reduce the hydrolysis rate of the hydrophilic core in the presence of an acid, wherein the core-shell particle comprises:

the hydrophilic core comprising the acid;

a hydrophobic shell, wherein the hydrophobic shell covers about 50% to about 100% of the surface area of the hydrophilic core, and wherein the shell forms from about 0.001 wt % to about 98 wt % of the overall weight of the core-shell particle; and a viscosifier, wherein the viscosifier is present in an amount of about 0.0001 wt % to about 10 wt % of the core shell particle;

placing a treatment fluid composition comprising the core-shell particle in the subterranean formation; and swelling the hydrophilic core up to 25 times by volume of the composition, wherein the hydrophilic core swells in the presence of the acid, and wherein the hydrophilic core comprises a hydrochloric acid payload; and releasing at least a partial amount of the hydrochloric acid payload from the hydrophilic core.

2. The method of claim 1, wherein the treatment fluid composition is selected from the group consisting of an acidizing fluid, an enhanced oil recovery fluid, a fracturing fluid, a drilling fluid, a pill, a remedial treatment fluid, logging fluid, and combinations thereof.

3. The method of claim 1, wherein the core-shell particle has a particle size of about 100 nm to about 1 mm.

4. The method of claim 1, wherein the shell has a thickness of about 1 nm to about 10 microns.

5. The method of claim 1, further comprising an additional payload selected from the group consisting of a base, a catalyst, a crosslinker, a breaker, a hydrophilic polymer, and combinations thereof.

6. The method of claim 5, wherein releasing the hydrochloric acid payload from the core-shell particle comprises releasing or removing the hydrophilic core from at least part of the shell.

7. The method of claim 1, wherein the hydrophilic core comprises a polymer comprising a repeating unit having the structure:

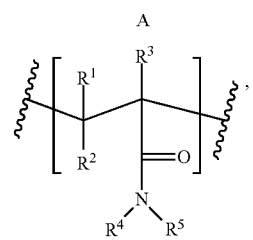

wherein $R^1$, $R^2$, $R^3$, $R^4$, and $R^5$ are each independently selected from —H, halo, and substituted or unsubstituted ($C_1$-$C_5$)hydrocarbyl interrupted by 0, 1, 2, or 3 groups independently selected from —O—, —S—, and substituted or unsubstituted —NH—.

8. The method of claim 1, wherein the hydrophilic core comprises a polymer comprising a repeating unit having the structure:

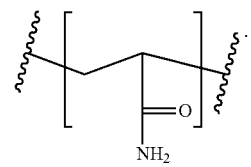

9. The method of claim 1, wherein the hydrophilic core comprises a polymer comprising at least one repeating unit that has a zwitterionic structure.

10. The method of claim 1, wherein the hydrophilic core comprises a polymer comprising a repeating unit having the structure:

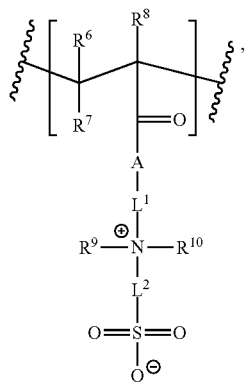

wherein

-A- is —O— or —NH—, $R^6$, $R^7$, $R^8$, $R^9$, $R^{10}$ are each independently chosen from —H, halo, and substituted or unsubstituted ($C_1$-$C_5$) hydrocarbyl interrupted by 0, 1, 2, or 3 groups independently selected from —O—, —S—, and substituted or unsubstituted —NH—, and $L^1$ and $L^2$ are each independently chosen from substituted or unsubstituted ($C_1$-$C_5$)hydrocarbylene interrupted by 0, 1, 2, or 3 groups independently selected from —O—, —S—, and substituted or unsubstituted —NH—.

11. The method of claim 1, wherein the hydrophilic core comprises a polymer comprising a repeating unit that has the structure:

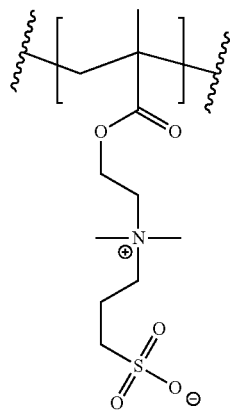

12. The method of claim 1, wherein the hydrophilic core comprises a polymer comprising a repeating unit that is formed from N-(2-methacryloyloxy)ethyl-N,N-dimethyl-ammonio propanesulfonate (SPE), having the structure:

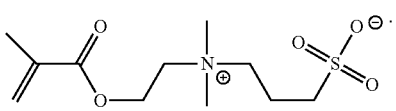

13. The method of claim 1, wherein the hydrophilic core comprises a polymer comprising a repeating unit that has the structure:

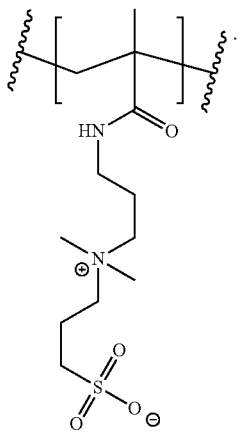

14. The method of claim 1, wherein the hydrophilic core comprises a polymer comprising a repeating unit that is formed from N-(3-methacryloylimino)propyl-N,N-dimethyl-ammonio propanesulfonate (SPP), having the structure:

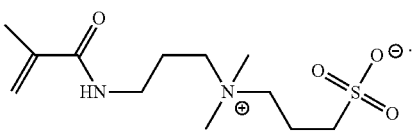

15. The method of claim 1, wherein the hydrophilic core comprises a polymer comprising a repeating unit having the structure:

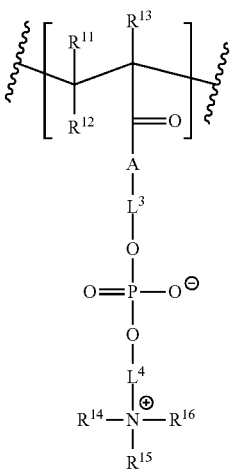

wherein

-A- is —O— or —NH—, $R^{11}$, $R^{12}$, $R^{13}$, $R^{14}$, $R^{15}$, $R^{16}$ are each independently chosen from —H, halo, and substituted or unsubstituted ($C_1$-$C_5$)hydrocarbyl interrupted by 0, 1, 2, or 3 groups independently selected from —O—, —S—, and substituted or unsubstituted —NH—, and $L^3$ and $L^4$ are each independently chosen from substituted or unsubstituted ($C_1$-$C_5$)hydrocarbylene interrupted by 0, 1, 2, or 3 groups independently selected from —O—, —S—, and substituted or unsubstituted —NH—.

16. The method of claim 1, wherein the hydrophilic core comprises a polymer comprising a repeating unit that has the structure:

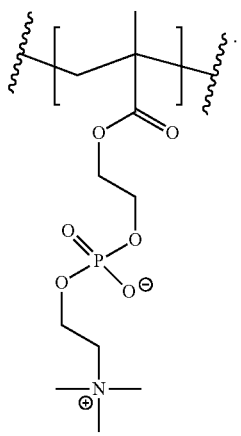

17. The method of any of claim 1, wherein the hydrophilic core comprises a polymer comprising a repeating unit that is formed from 2-(methacryloyloxy)ethylphosphatidylcholine (MPC), having the structure:

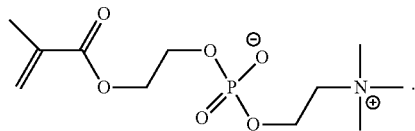

18. The method of claim 1, wherein the hydrophilic core comprises a polymer comprising a repeating unit having the structure:

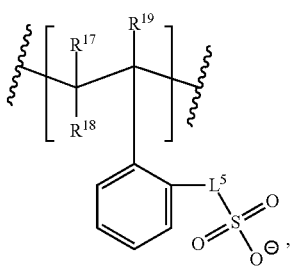

wherein $R^{17}$, $R^{18}$, and $R^{19}$ are each independently chosen from —H, halo, and substituted or unsubstituted ($C_1$-$C_5$) hydrocarbyl interrupted by 0, 1, 2, or 3 groups independently selected from —O—, —S—, and substituted or unsubstituted —NH—, and $L^5$ is independently substituted or unsubstituted ($C_1$-$C_5$) hydrocarbylene interrupted by 0, 1, 2, or 3 groups independently selected from —O—, —S—, and substituted or unsubstituted —NH—.

19. The method of claim 1, wherein the hydrophilic core comprises a polymer comprising a repeating unit that has the structure:

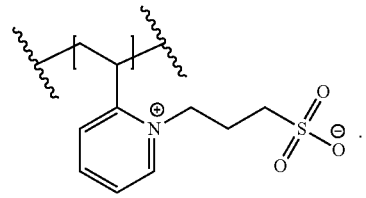

20. The method of claim 1, wherein the hydrophilic core comprises a polymer comprising a repeating unit that is formed from 3-(2'-vinyl-pyridinio)propanesulfonate (SPV), having the structure:

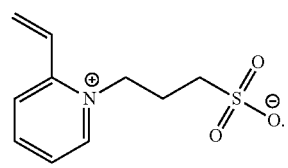

21. The method of claim 1, wherein the hydrophilic core comprises a polymer comprising a repeating unit having the structure:

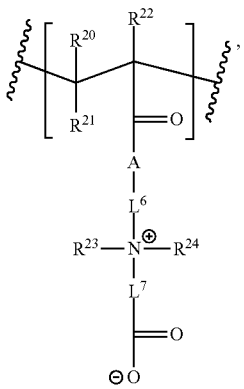

wherein

-A- is —O— or —NH—,

—$R^{20}$, $R^{21}$, $R^{22}$, $R^{23}$, $R^{24}$— are each independently chosen from —H, halo, and substituted or unsubstituted ($C_1$-$C_5$)hydrocarbyl interrupted by 0, 1, 2, or 3 groups independently selected from —O—, —S—, and substituted or unsubstituted —NH—, and $L^6$ and $L^7$ are each independently chosen from substituted or unsubstituted ($C_1$-$C_5$)hydrocarbylene interrupted by 0, 1, 2, or 3 groups independently selected from —O—, —S—, and substituted or unsubstituted —NH—.

22. The method of any claim 1, wherein the hydrophilic core comprises a polymer comprising repeating units having the structure:

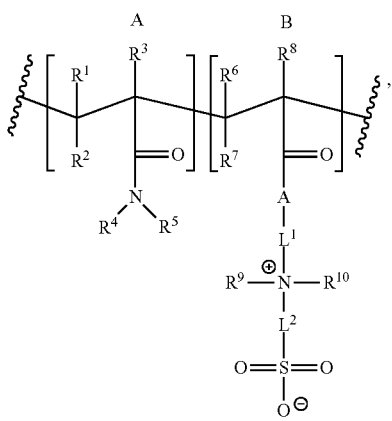

wherein
- at each occurrence repeating units A and B independently occur in the direction shown or in the opposite direction,
- repeating units A and B have a block or random copolymer arrangement,
- $R^1$, $R^2$, $R^3$, $R^4$, and $R^5$ are each independently selected from —H, halo, and substituted or unsubstituted $(C_1-C_5)$hydrocarbyl interrupted by 0, 1, 2, or 3 groups independently selected from —O—, —S—, and substituted or unsubstituted —NH—,
- -A- is —O— or —NH—,
- $R^6$, $R^7$, $R^8$, $R^9$, $R^{10}$ are each independently chosen from —H, halo, and substituted or unsubstituted $(C_1-C_5)$ hydrocarbyl interrupted by 0, 1, 2, or 3 groups independently selected from —O—, —S—, and substituted or unsubstituted —NH—,
- $L^1$ and $L^2$ are each independently chosen from substituted or unsubstituted $(C_1-C_5)$hydrocarbylene interrupted by 0, 1, 2, or 3 groups independently selected from —O—, —S—, and substituted or unsubstituted —NH—,
- repeating unit A is about 1 mol % to about 90 mol % of the polymer in the hydrophilic core, and repeating unit B is about 10 mol % to about 99 mol % of the polymer in the hydrophilic core.

23. The method of any of claim 1, wherein the hydrophilic core comprises a polymer crosslinked via a polyvinyl monomer chosen from a $(C_1-C_{20})$alkylenebiacrylamide, a poly$((C_1-C_{20})$alkenyl)-substituted mono- or poly-$(C_1-C_{20})$alkyl ether, a poly$(C_2-C_{20})$alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, and combinations thereof.

24. The method of claim 1, wherein the hydrophobic shell comprises a polymer comprising at least one repeating group that is hydrophobic.

25. The method of claim 24, wherein the polymer comprising the at least one repeating group that is hydrophobic is about 50 wt % to about 100 wt % of the hydrophobic shell.

26. The method of claim 1, wherein the hydrophobic shell comprises a polymer comprising a repeating group that is formed by polymerization of a $(C_2-C_{20})$alkenyl-substituted $(C_6-C_{50})$aryl group, wherein the $(C_6-C_{50})$aryl group is further substituted or unsubstituted.

27. The method of claim 1, wherein the hydrophobic shell comprises a polymer comprising a repeating group that is formed by polymerization of a vinyl-substituted phenyl group, wherein the phenyl group is substituted or unsubstituted.

28. The method of claim 1, wherein the hydrophobic shell comprises a polymer comprising a repeating group formed by polymerization of styrene.

29. The method of claim 1, wherein the hydrophobic shell comprises a polymer comprising a repeating group formed by polymerization of a substituted or unsubstituted $(C_1-C_{50})$ hydrocarbyl ester of a $(C_1-C_{50})$alkenyl-C(O)OH, wherein the $(C_1-C_{50})$hydrocarbyl is optionally interrupted by 0, 1, 2, or 3 groups independently selected from —O—, —S—, substituted or unsubstituted —NH—, —(CH$_2$—CH$_2$—O)$_{n8}$—, and —(CH$_2$—CH$_2$—CH$_2$—O)$_{n8}$—, wherein n8 is about 1 to about 10,000.

30. The method of claim 1, wherein the hydrophobic shell comprises a polymer comprising a repeating group formed by polymerization of a substituted or unsubstituted $(C_1-C_{10})$ alkyl ester of a substituted or unsubstituted acrylic acid.

31. The method of claim 1, wherein the hydrophobic shell comprises a polymer comprising a repeating group formed by polymerization of methyl methacrylate.

32. The method of claim 1, further comprising combining the treatment fluid composition with at least one fluid selected from the group consisting of an aqueous or oil-based drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing of the treatment fluid composition in the subterranean formation comprises placing the mixture in the subterranean formation.

33. The method of claim 1, wherein the treatment fluid composition further comprises at least one component selected from the group consisting of water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, and combinations thereof.

* * * * *